T. CAHILL.
TYPE WRITING MACHINE.
APPLICATION FILED NOV. 4, 1899. RENEWED FEB. 5, 1916.

1,197,103.

Patented Sept. 5, 1916.
12 SHEETS—SHEET 1.

T. CAHILL.
TYPE WRITING MACHINE.
APPLICATION FILED NOV. 4, 1899. RENEWED FEB. 5, 1916.
1,197,103.
Patented Sept. 5, 1916.
12 SHEETS—SHEET 3.
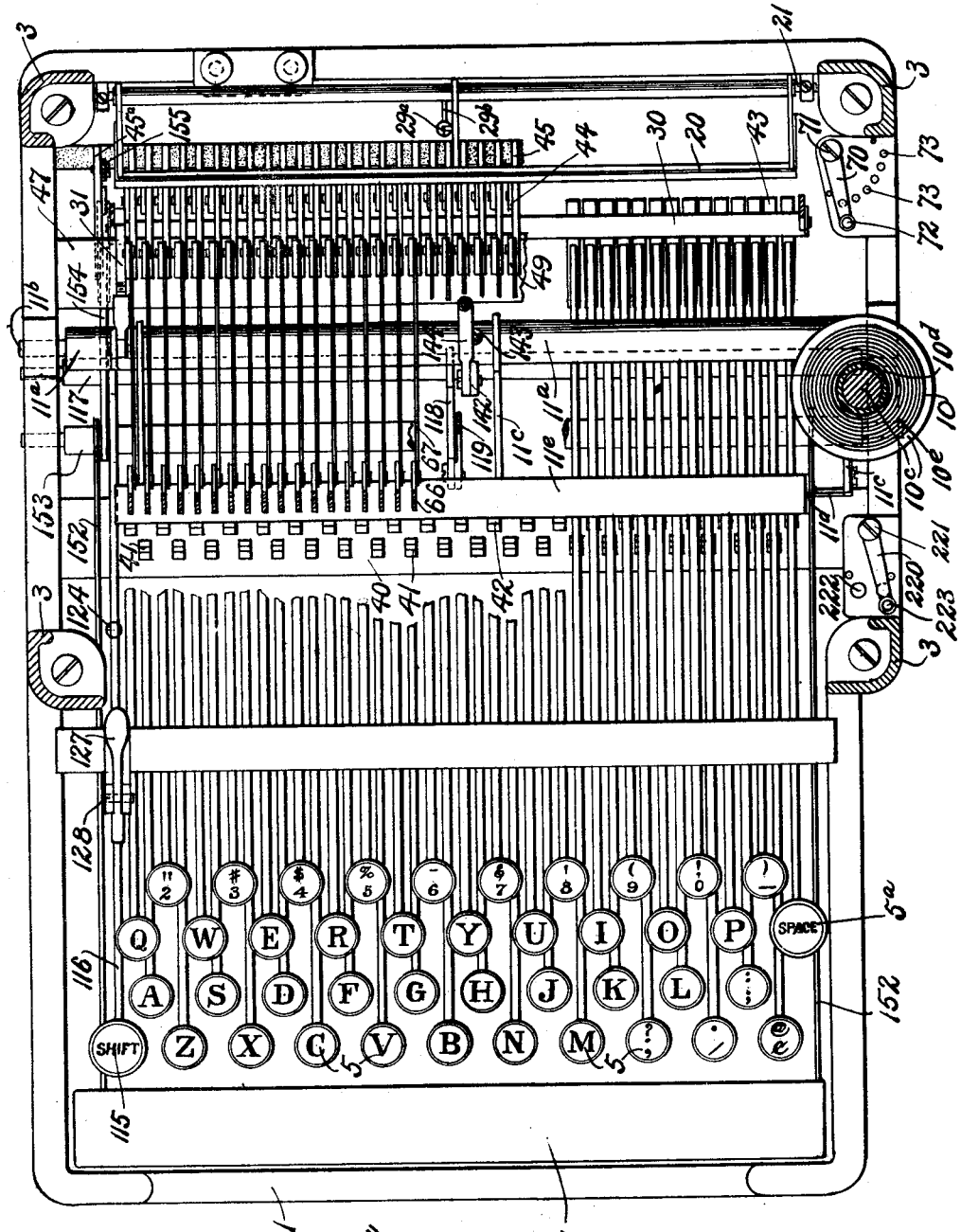
Fig. 2ª.

T. CAHILL.
TYPE WRITING MACHINE.
APPLICATION FILED NOV. 4, 1899. RENEWED FEB. 5, 1916.

1,197,103.

Patented Sept. 5, 1916.
12 SHEETS—SHEET 4.

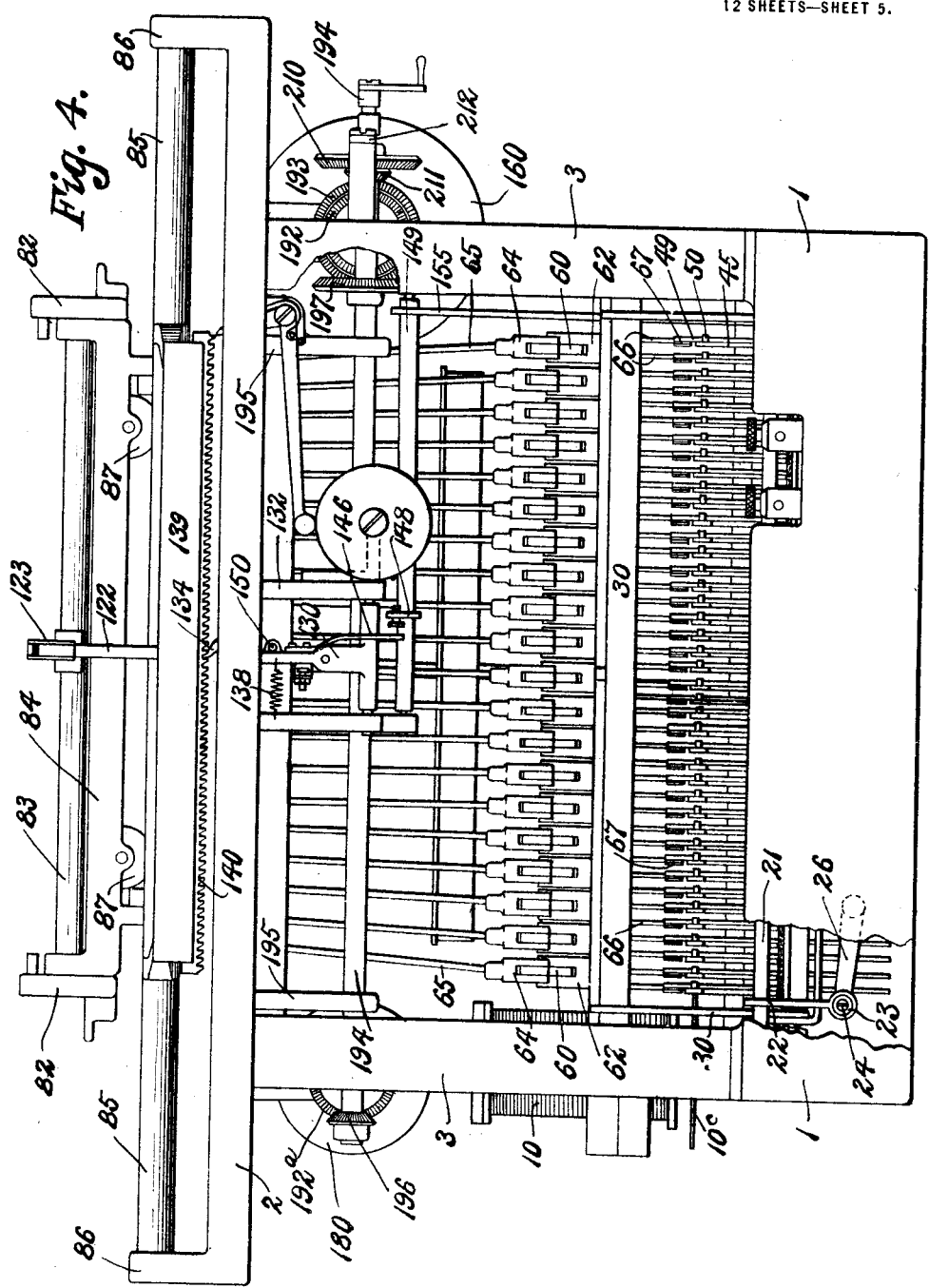

T. CAHILL.
TYPE WRITING MACHINE.
APPLICATION FILED NOV. 4, 1899. RENEWED FEB. 5, 1916.
1,197,103.
Patented Sept. 5, 1916.
12 SHEETS—SHEET 6.
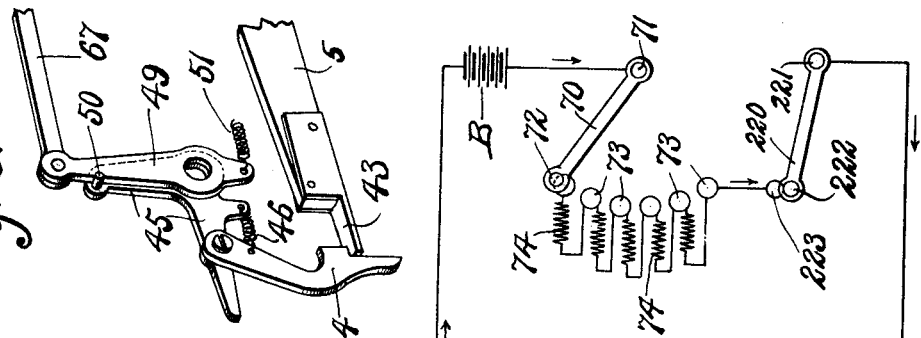
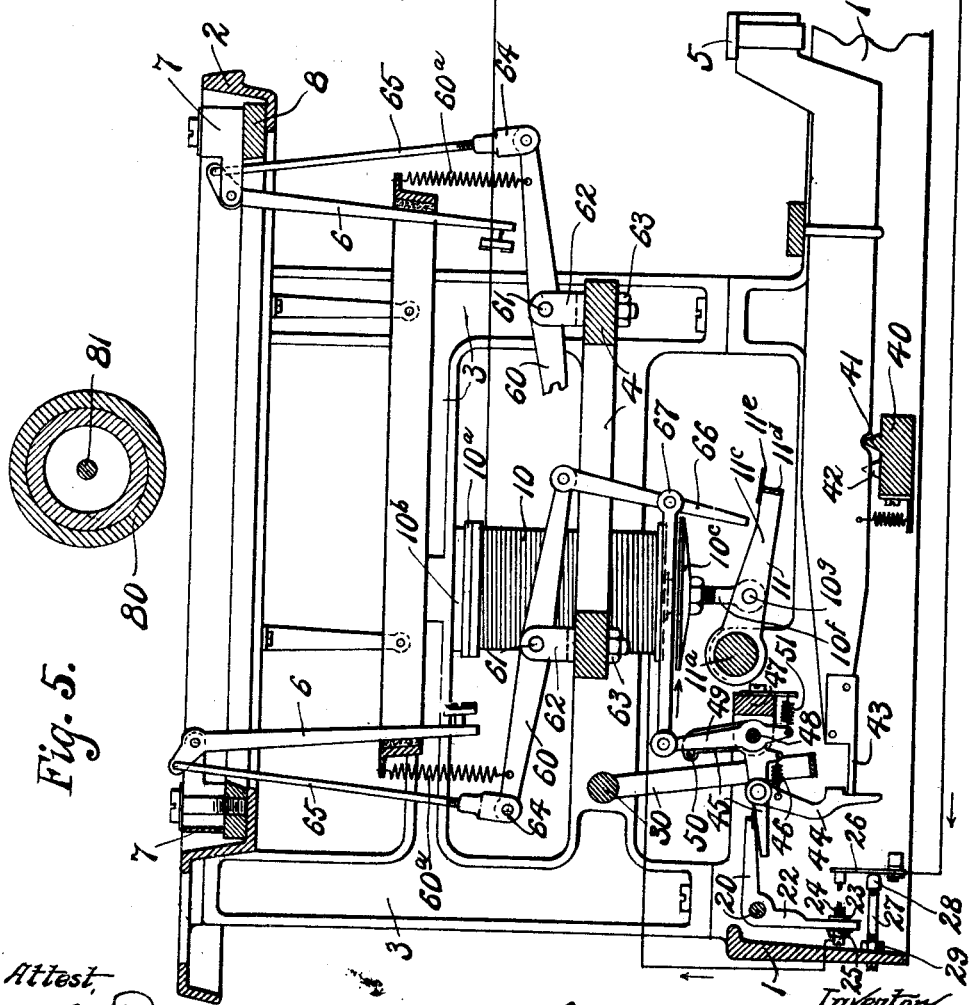

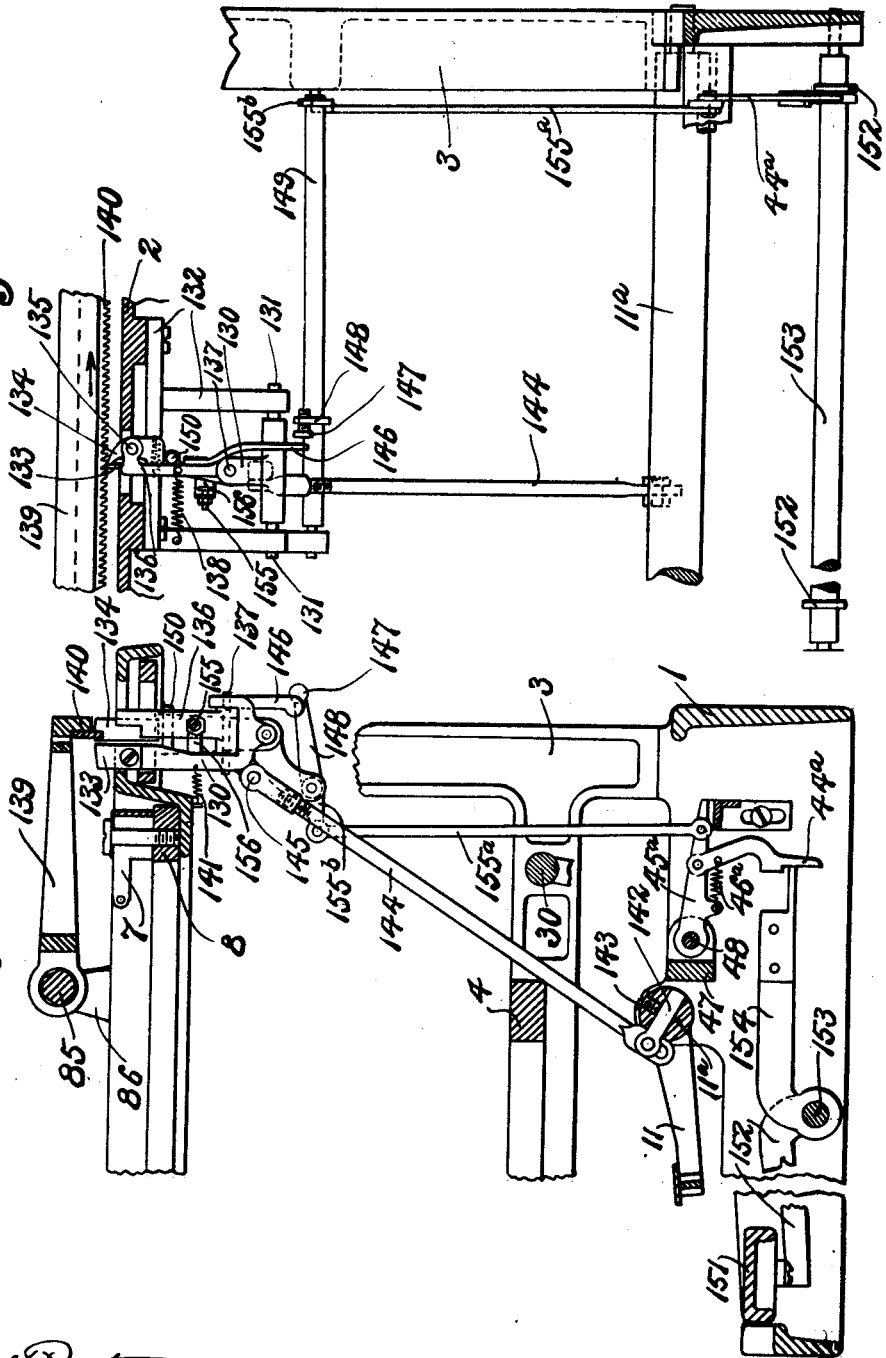

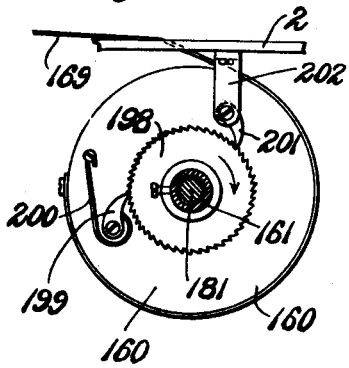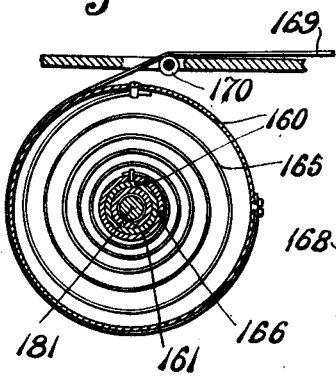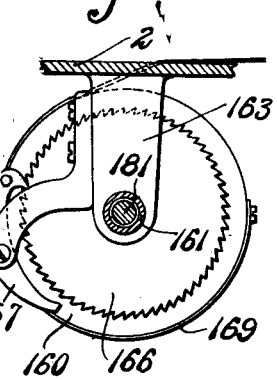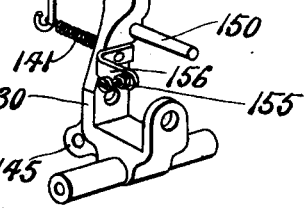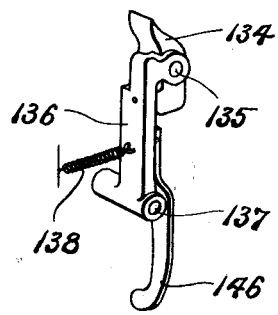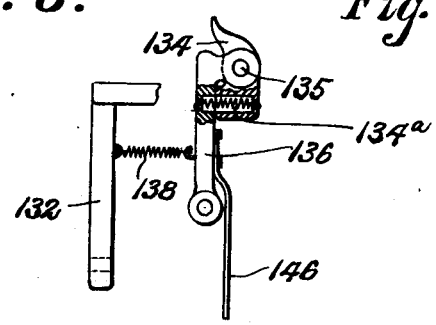

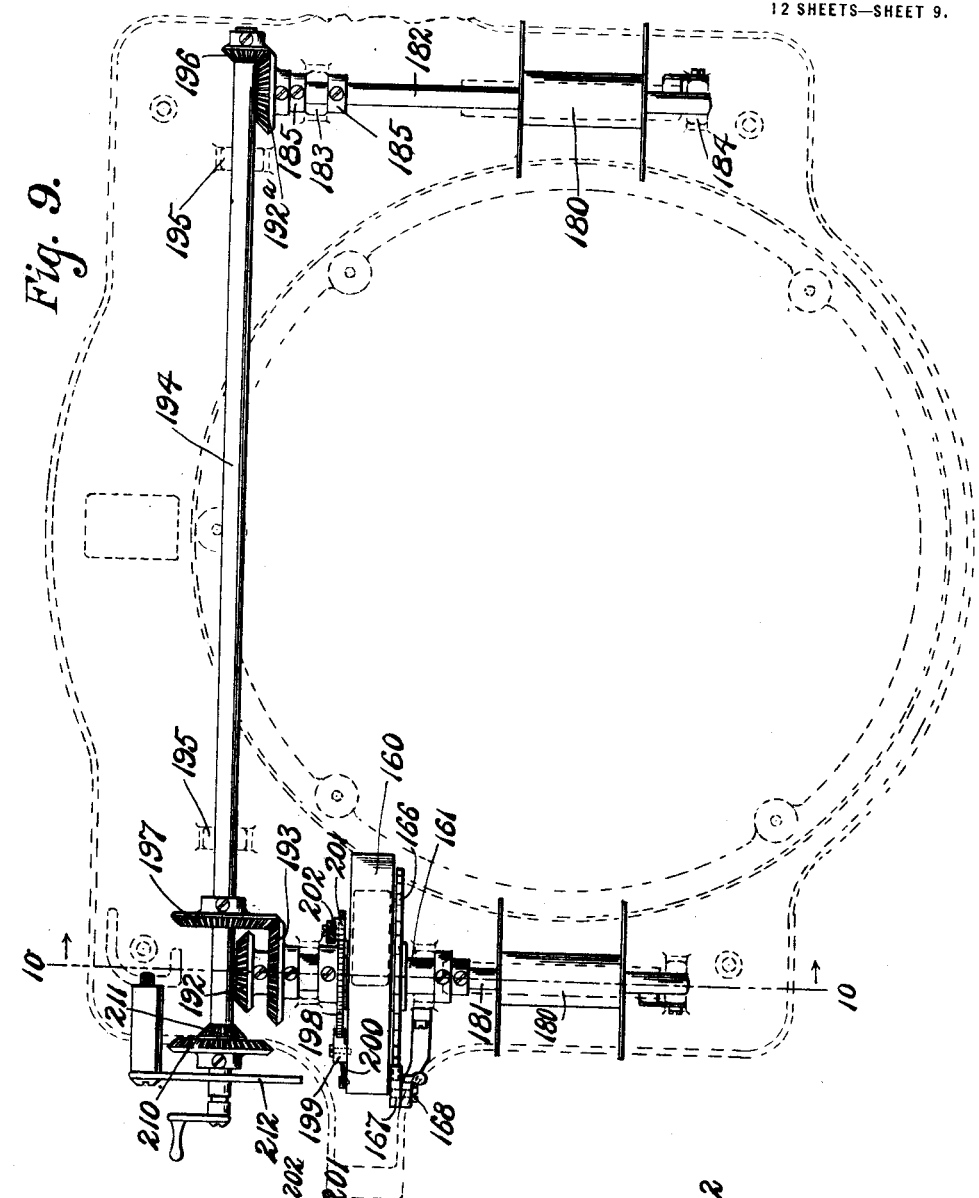

T. CAHILL.
TYPE WRITING MACHINE.
APPLICATION FILED NOV. 4, 1899. RENEWED FEB. 5, 1916.
1,197,103.
Patented Sept. 5, 1916.
12 SHEETS—SHEET 10.
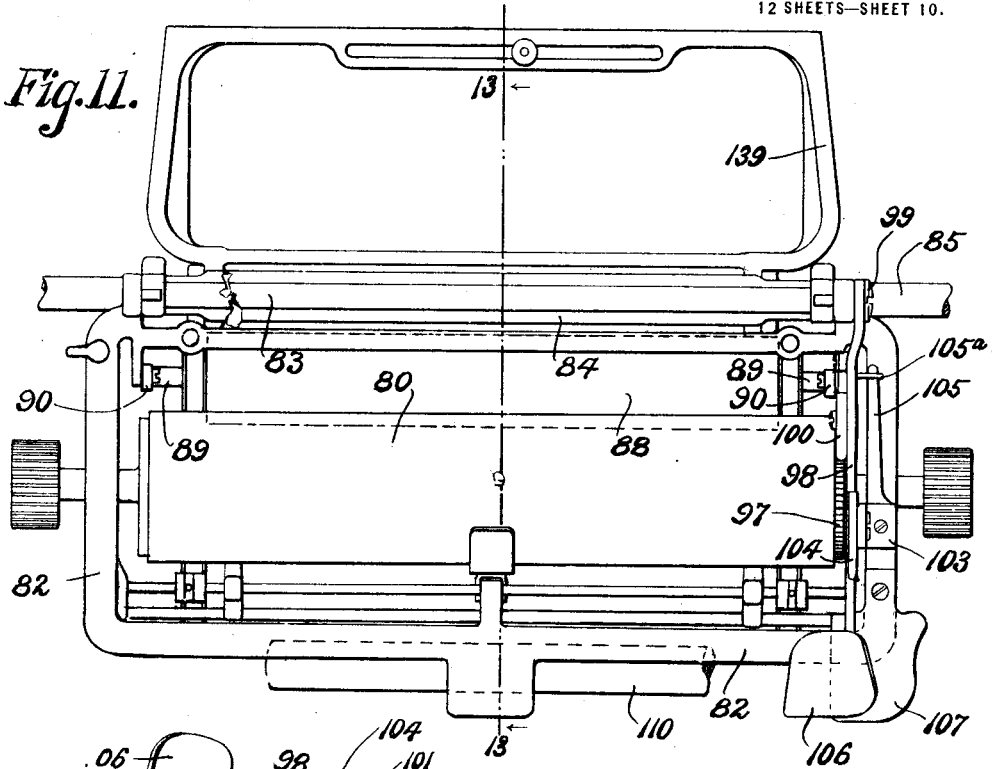
Fig. 11.
Fig. 12.
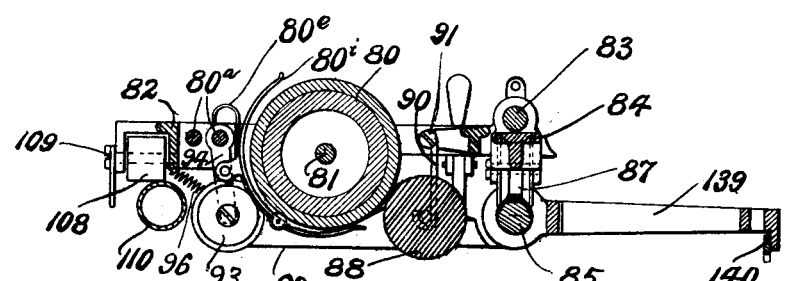
Fig. 13.
Attest
A. M. Poynter
Arthur T. Cahill
Inventor
Thaddeus Cahill T. CAHILL.
TYPE WRITING MACHINE.
APPLICATION FILED NOV. 4, 1899. RENEWED FEB. 5, 1916.

1,197,103.

Patented Sept. 5, 1916.
12 SHEETS—SHEET 11.

Attest:
A. M. Poynton.
Arthur T. Cahill.

Inventor:
Thaddeus Cahill.

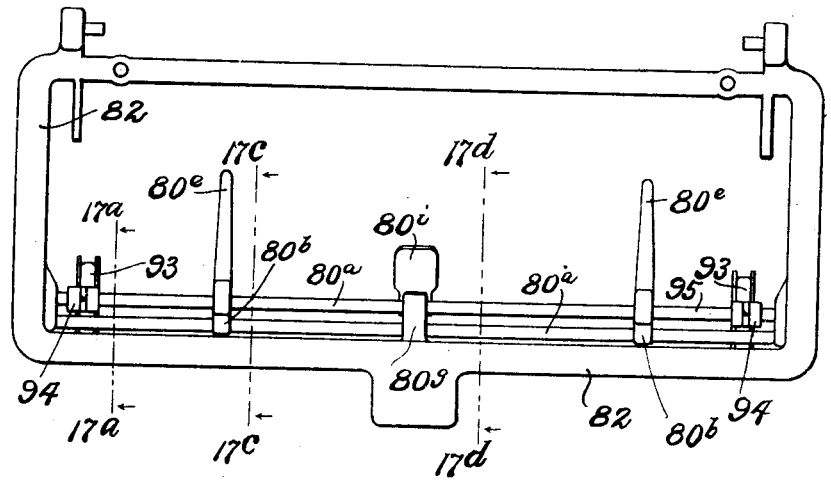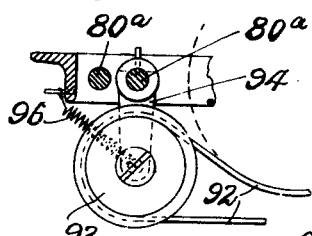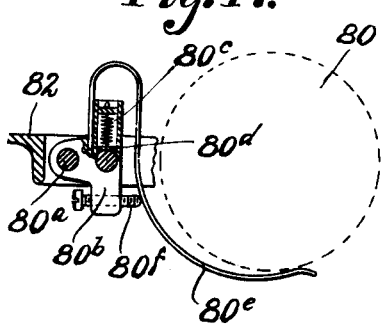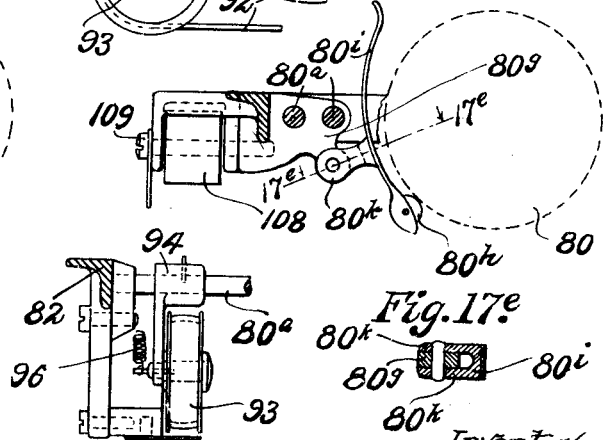

UNITED STATES PATENT OFFICE.

THADDEUS CAHILL, OF NEW YORK, N. Y., ASSIGNOR TO JAMES B. LAMBIE, E. HILTON JACKSON, GEORGE FREDERICK CAHILL, AND ARTHUR T. CAHILL, TRUSTEES.

TYPE-WRITING MACHINE.

1,197,103. Specification of Letters Patent. Patented Sept. 5, 1916.

Application filed November 4, 1899, Serial No. 735,813. Renewed February 5, 1916. Serial No. 76,459.

*To all whom it may concern:*

Be it known that I, THADDEUS CAHILL, a citizen of the United States, and of the city, county, and State of New York, residing temporarily at Washington, in the District of Columbia, have invented certain new and useful Improvements in Type-Writing Machines, of which the following is a specification.

The machine hereinafter described is in the nature of an improvement upon typewriting machines illustrated and described in divers patents of the United States to me, and applications for patents of the United States filed by me in the United States Patent Office, and now pending there; and particularly upon machines illustrated and described in my pending application No. 601,520 filed August 3, 1896 and No. 700,234 filed December 24, 1898, which applications have issued since the original filing date of this application as Letters Patent No. 656,576 dated August 21, 1900, and No. 657476, dated September 4, 1900.

The object of my present invention is to make a typewriting machine, very simple in its construction, durable, and in which the work is done by power other than that exerted by the operator upon the key; and my invention consists in the improvements and combinations hereinafter described and specifically set forth in the statement of claim at the end hereof.

Figure 1:
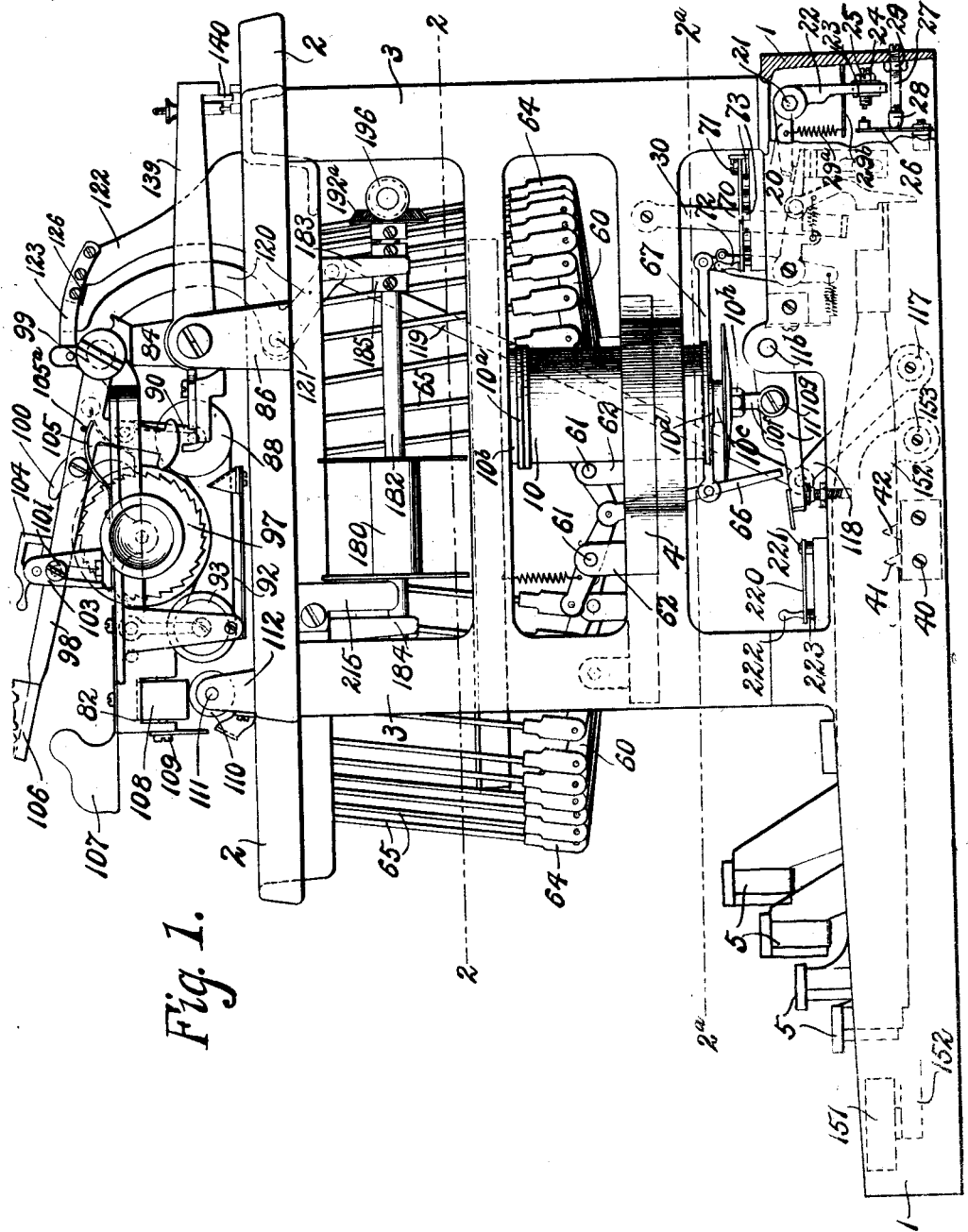
Figure 2:
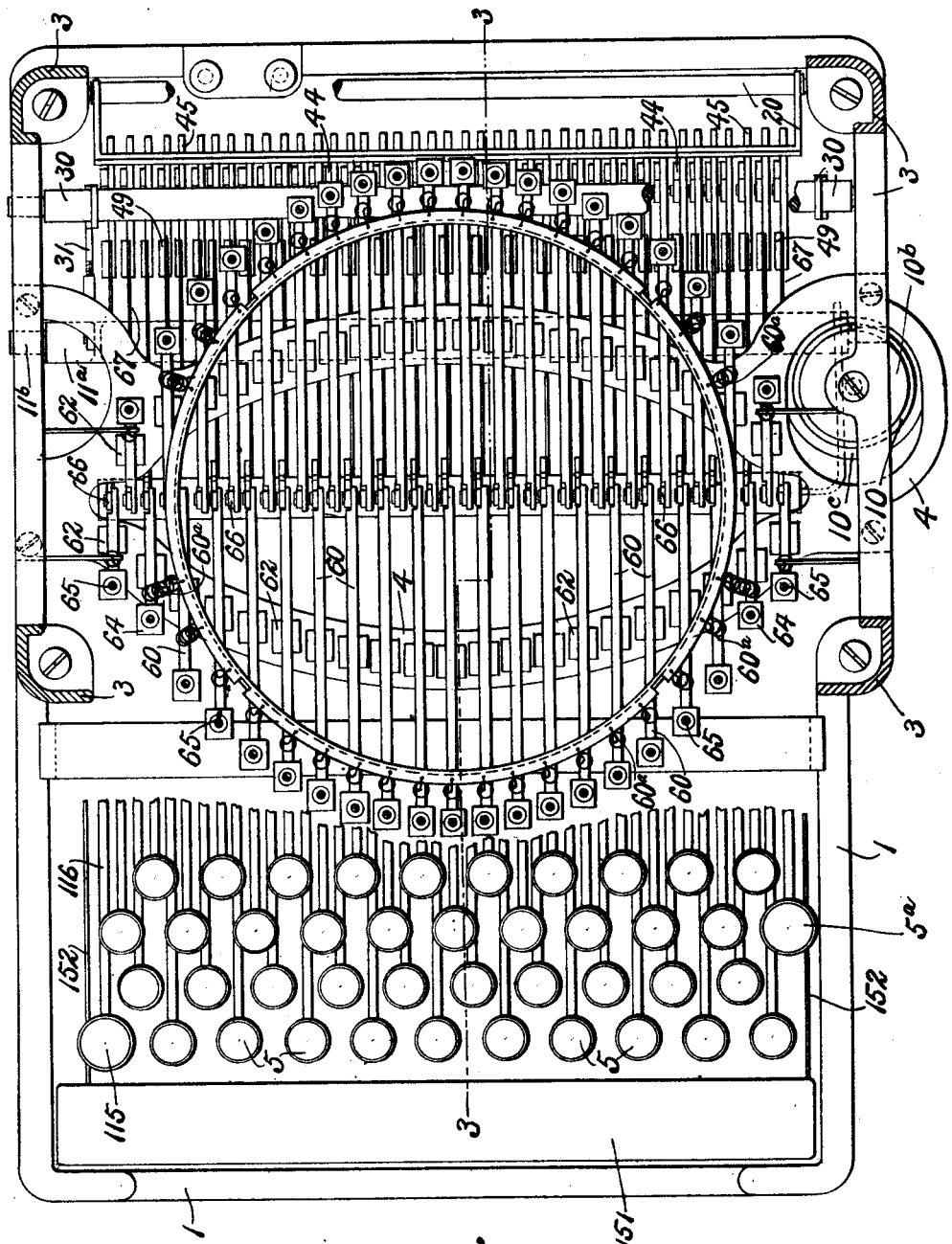
Figure 3:
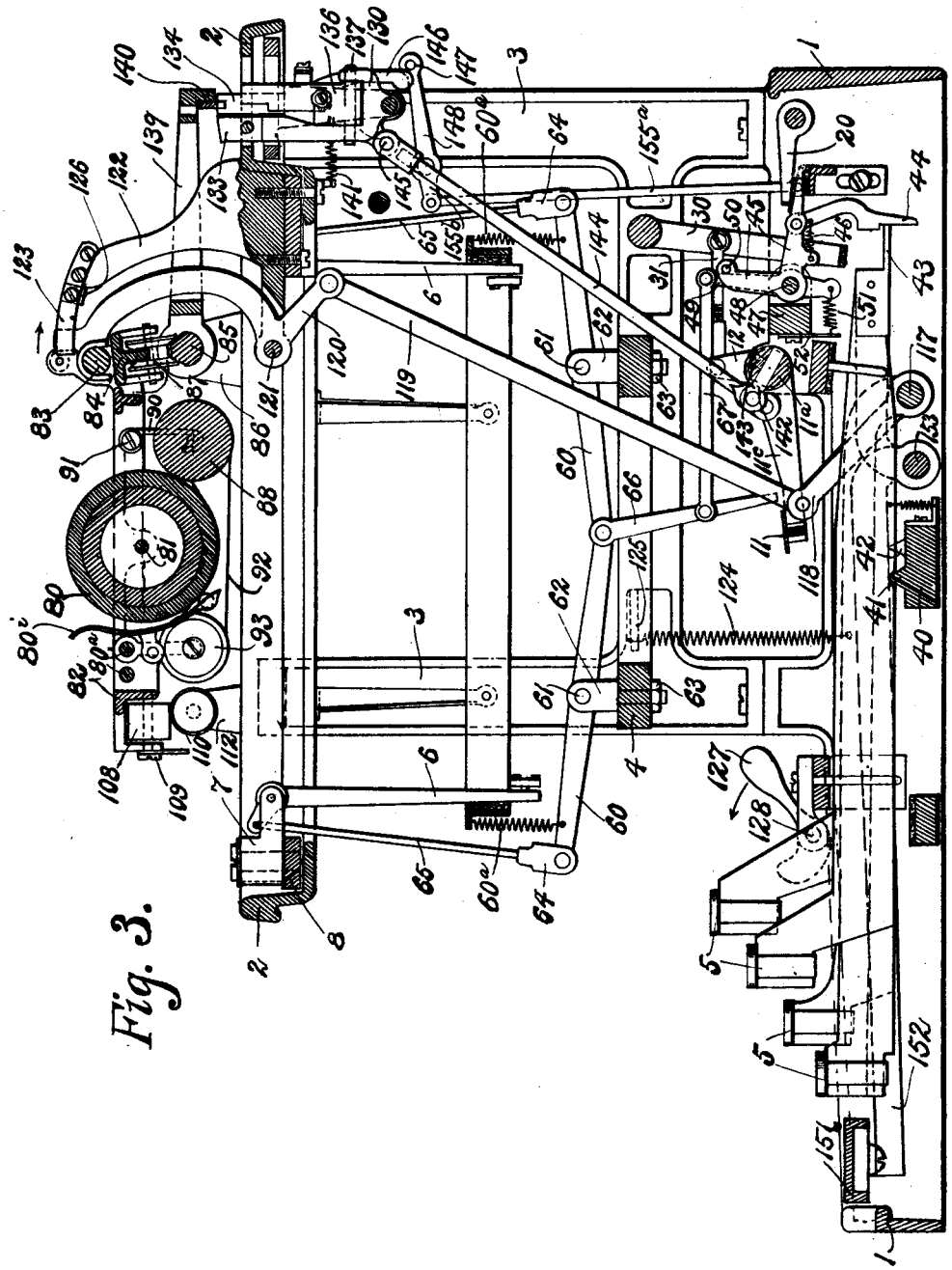
Figure 14:
Figure 15:
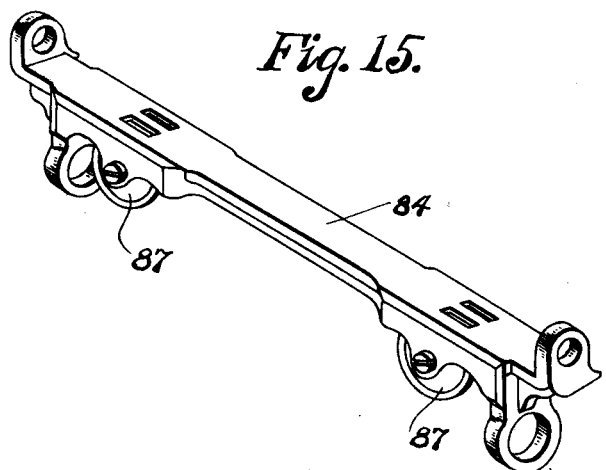
Figure 16:
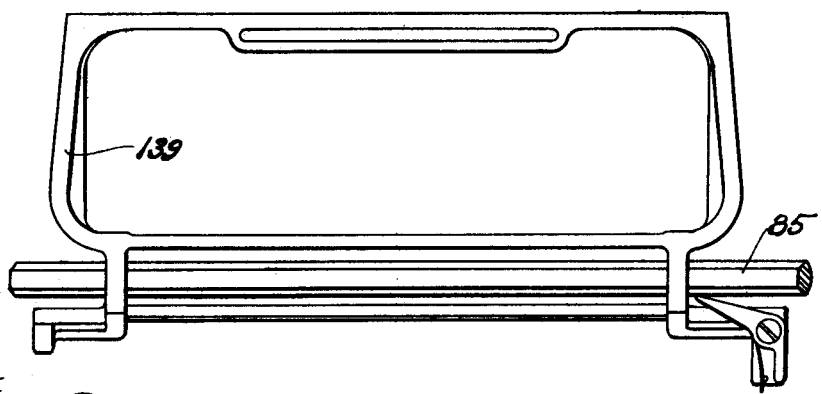

The drawings illustrate a machine built in accordance with the principles of my inventions, and in these drawings—Figure 1 is a side elevation of the machine; Fig. 2 is a horizontal section on the line 2, 2, of Fig. 1; the type-bars being omitted; Fig. $2^a$ is a horizontal section on the line $2^a$, $2^a$ of Fig. 1, and in this view certain portions of the mechanism are broken away in order to expose other parts to view; Fig. 3 is a longitudinal, vertical section, on the line 3, 3, of Fig. 2; Fig. 4 is a rear elevation; Fig. 5 is a detail section, partly in elevation, illustrating the type-bar actuating mechanism; Fig. 6 is a detail, perspective view, illustrating the rear end of a key with the connection between the same and the link 67, by which the corresponding pivoted movement-receiving arm is thrown over the motor-frame; Fig. 7 is a detail side elevation, partly in section, illustrating the spacing mechanism; Fig. 8 is a rear view of the same; Fig. $8^a$ is a detail perspective view of the fast dog and carrier; Fig. $8^b$ is a detail perspective view of the loose dog and carrier; Fig. $8^c$ is a detail elevation, partly in section, of the loose dog and carrier; Fig. 9 is a plan view illustrating the ribbon-operating mechanism; the top plate, below which said mechanism lies, being shown in dotted lines; Fig. 10 is a detail section, partly in elevation, on the line 10, 10, of Fig. 9; Fig. $10^a$ is a rear view of the spring-box; Fig. $10^b$ is a front view of the spring-box; Fig. $10^c$ is a sectional view of the spring-box; Fig. 11 is a top view of the paper-carriage, yoke, and rack-frame; Fig. 12 is an elevation of the same viewed from the right of the operator; and Fig. 13 is a cross-section on the line 13, 13, of Fig. 11; Fig. 14 is a front elevation of the yoke, which connects the shifting platen-carrier with the hinge-and-guide rod; Fig. 15 is a detail perspective view of the same; Fig. 16 is a plan view of the rack-frame; Fig. 17 is a plan view of the paper-carriage-frame; Fig. $17^a$ is a detail sectional view of the tension band pulley, on the line $17^a$ $17^a$ of Fig. 17; Fig. $17^b$ is a front view of the same; Fig. $17^c$ is a detail sectional view of a spring paper-guide-finger on the line $17^c$ $17^c$ of Fig. 17; Fig. $17^d$ is a detail sectional view of the paper-finger, on the line $17^d$ $17^d$ of Fig. 17; Fig. $17^e$ is a detail sectional view on the line $17^e$ $17^e$ of Fig. $17^d$. Figs. $17^a$, $17^b$, $17^c$, $17^d$, and $17^e$ are on a larger scale, it will be observed, than the preceding figures.

Similar letters refer to similar parts in all the figures.

1 is the bed-plate; 2 is the top-plate; 3, 3, the sides, bolted to the bed-plate and carrying the top-plate; 4 is the fulcrum-plate, attached to the side-plates, 3, 3; 5, 5, are the keys; 6, 6, the type-bars, mounted by means of hangers, 7, 7, screwed to the hanger-ring 8, in the usual fashion.

10 is the motor-magnet, arranged in the manner hereinafter described, to actuate the type-bars.

11 is the motor-frame actuated by the magnet 10, and serving as a medium between said magnet and type-bars.

20 is the circuit-closing frame, which acts when a key is depressed, to close the circuit of magnet 10, before mentioned.

30 is the releasing-frame, actuated by the magnet 10, aforesaid, and acting to release the type-bar and spacing dogs, to permit the same to return to their normal positions in advance of the release of the key.

*Type-bar controlling mechanism.*—The movement of the type-bars is controlled by the keys. That is to say, when any key is depressed the corresponding type-bar is caused to operate; but the type-bars are not actuated by the keys. They are actuated by a motor device, preferably the magnet 10 before mentioned. The keys 5, 5, are fulcrumed upon the bar 40, which is provided with two rows of fulcrum points 41 and 42; the front row 41, serving for the two front rows or banks of keys, while the rear fulcrum points 42, serve for the two rear rows or banks of keys. The use of the two rows of fulcrum points is to approximately equalize the leverages of the keys. Each of the key levers, 5, 5, is furnished at the rear with a metal extension piece, which is so shaped as to act upon the jack 44, and to leave room for the releasing frame 30 to operate. Overlying each of the key extensions 43 is a jack 44, pivoted to the bell-crank 45, and held by a contractile spring 46, in engagement with the key extension 43. The bell-cranks 45, are mounted in slots milled transversely in a bar 47, and each is pivoted on a rod 48. Corresponding to each of the bell-cranks and mounted side by side with it in the same slot in the milled bar 47, is an arm 49, upon which a pin 50 in bell-crank 45 acts when the key is depressed to throw the arm in the direction of the arrow in Fig. 5. The arm 49 is held normally in engagement with the pin 50, by the contractile spring 51 attached to the plate 52. Corresponding to the type-bars is a set of levers 60, 60, which for distinction's and convenience's sake we may term type-bar-corresponding levers. Each of these levers is fulcrumed upon a pin 61, set in the milled slot in the top of the fulcrum piece 62, which fulcrum piece is furnished with a screw-threaded shank which enters a hole in the fulcrum plate 4, and is held fast therein by a retaining nut 63. The fulcrums of the type-bar corresponding levers 60, 60, are preferably disposed in an elliptical or quasi-elliptical fashion, and they are made preferably of varying lengths, as illustrated, for example, in Fig. 2, so that when their outer ends are connected by links 64 pivoted to the type-bar-corresponding levers and screw-threaded to receive the rod or wire 65 connected with the corresponding type-bar, their inner ends lie in juxtaposition. To the inner end of each of said type-bar-corresponding levers is hinged or pivoted a movement-receiving arm, 66, which is connected by a link 67, with the arm 49, before mentioned. The movement-receiving arms, 66, lie in proximity to the striking surface of the oscillating motor frame 11, but normally clear of it. Said motor frame 11, as I have constructed it (though the details of construction may be altered very widely according to the judgment of the constructor,) consists of a center rod or shaft $11^a$, pivoted on hardened points $11^b$, and having arms $11^c$, $11^c$, brazed or silver-soldered to it. To these arms is attached a front piece $11^d$, of sheet metal, arranged on edge, with another piece $11^e$ silver soldered, brazed or otherwise suitably attached thereto, and acting to give movement to the movement-receiving arms 66, 66. By these means I obtain a maximum of strength with a minimum of inertia, which I have found by much experiment to be of some importance in securing the necessary rapidity of operation without an undue amount of noise and vibration, or an undesirable amount of spark in the interrupting of the circuit of the motor magnet; but while I consider these details of construction of some importance, I do not at all limit myself to them in the carrying out of the broader features of my invention.

The motor frame 11, is actuated by the magnet 10. Said magnet may of course be of any suitable form, but to obtain the requisite rapidity of operation I have been using a magnet consisting of a core piece $10^a$ attached to a soft iron plate $10^b$, (which plate is attached to one of the side plates 3,) a cylindrical armature $10^c$, lying in line with the core piece $10^a$ and inside the same tube, $10^d$, and having outside said tube an enlarged head to allow the magnetism to flow more readily into the air, by which the return circuit is completed; about the tube $10^d$, is wound the energizing coil $10^e$; a link $10^f$ connected by a shoulder-pin $10^g$ to the motor-frame 11, and having the other end screw-threaded to enter the armature $10^c$, is provided with a lock-nut $10^h$, whereby the necessary adjustment of the armature $10^c$, with relation to the core-piece $10^a$, can be made instantly. The effect of the whole arrangement is that when a key is depressed and the circuit of the motor-magnet 10 closed, the core-piece $10^a$, acting on the armature $10^c$, gives movement to the motor-frame 11, which in turn gives movement to the type-bar corresponding to the key depressed, and also to the space-dogs in the manner hereinafter described.

20 is, as aforesaid, the circuit-closing frame, which consists of (a) an axial shaft fulcrumed by means of points 21, 21, set in the bed-plate, the front part overlying all the bell-cranks 45, 45; (b) horizontal arms connecting said front part with the axial shaft; and (c) a vertical arm 22, in which an insulating bushing 23 of hard fiber, vulcanite or other suitable material is fixed to carry the contact screw 24, furnished with a platinum point and adjustable by a nut 25, which contact screw serves, when a key is depressed, to make connection with the contact spring 26, thereby closing the circuit of the battery B, or other source of voltage through the motor-magnet 10 before mentioned. I have found it advantageous, in securing the most rapid operation, to have the contact-spring 26 normally under a little tension. The necessary tension is given by means of the adjusting screw 27, set in the back of the bed-plate 1, and having an insulating cap 28 to bear against the contact-spring 26, and a lock nut 29, whereby its position can be adjusted to give the spring 26 the tension required. Any key, then, when depressed connects the corresponding type-bar with the motor frame, and causes the circuit of the motor-magnet 10 to be closed so that said magnet becomes energized, and giving movement to the motor-frame 11, actuates said type-bar. In other words, each key when depressed by the operator in front of the center, rises back of the center, and through the jack 44, bell-crank 45, and pin 50, gives movement to the arm 49, and the link 67, throwing the movement-receiving arm 66, connected with one end of the type-bar-corresponding lever, (whose other end is connected with the short arm of the type-bar corresponding to the key depressed) over the motor frame 11; and at the same time said bell-crank 45, acting upon the circuit-closing frame brings the contact-screw 24, carried by the arm 22, into connection with the contact spring 26, thereby closing the circuit of battery B through the motor-magnet 10, whereupon said magnet gives movement to the motor-frame 11, movement-receiving arm, 66, type-bar-corresponding lever 60, and type-bar 6, corresponding to the key depressed, throwing said type-bar toward the printing point.

As the type-bar moves toward the printing point the releasing frame 30, which is connected by a link 31 with the arm 12, of the motor-frame, strikes the jack 44, throwing it off of the key extension 43, whereupon the circuit-closing frame 20, the bell-crank 45, and the jack 44, return to their normal positions under the influence of gravitation and the returning spring 29ª of the circuit-closing frame, one end of which spring is attached to an arm on the circuit-closing frame, while the other is attached to a pin 29ᵇ, set in the back of the bed-plate 1. By this means the type-bar is left free to return to its normal position in advance of the releasing of the key; also, as the current is cut off before the type-bar strikes, clean printing is insured, for the type-bar being free to rebound, will not vibrate or strike the paper a second time. Further, as the spacing mechanism is actuated by the motor-magnet 10, in the manner hereinafter described, the action of the releasing frame upon the jack 44 leaves the space-dogs free to return to their normal positions independently of the releaase of the key. The effect of all of which is that the operator does not have to release one key before he depresses another, but is able to use a legato or connected touch, similar to that ordinarily used in playing a pianoforte or organ, whereby a great increase in speed and comfort of operation is attained. Another and very important advantage resulting from this automatic releasing, is the fact that the current of the motor-magnet 10 being thus automatically broken an instant after the circuit has been closed, and much earlier than the release of the key, heating and burning out of the magnet are avoided, where they would otherwise exist. With this automatic releasing device, and winding the magnet with No. 27 or No. 28 Brown & Sharpe gage, single silk wire, I use without difficulty a line current at 110 volts, and thus avoid the use of a battery.

To vary the force of the blow a rheostat is used, consisting of a conducting arm 70, centered at 71, and having a handle 72. Said arm sweeps across and makes connection with the contact-pieces 73, 73, whatever one may be required. The said contact pieces are connected with each other by resistances 74, 74; the arrangement of all of which is clearly illustrated diagrammatically in Fig. 5. By setting the arm 70 in different positions, different resistances are given to the circuit of the motor-magnet and the power of the blow varied as required.

A switch, 220, fulcrumed at 221, and having a handle 222, makes connection with the metal piece 223, or breaks connection therewith, according to the position in which the handle 222 is thrown. Thus, by the rheostat the strength of the current is varied, and by the switch the current is cut off from or let into the machine, as required.

*The paper carriage.*—The paper carriage illustrated in the drawings is similar in principle to that illustrated in my pending application No. 734,864 dated October 26, 1899.

80 is the platen, mounted upon a shaft 81, which latter is set in the carriage frame. Said frame consists of a casting 82, with a bar 83, at the back, as illustrated in the drawings. A yoke-piece 84, is hinged to the back rod 83 of the carriage frame, and to the hinge-and-guide-rod 85, which latter is supported by lugs 86, 86, rising from the top-plate 2. Said yoke-piece 84 is furnished with wheels 87, 87, which ride upon the hinge and guide rod 85. A pressure roller 88, having a rod 89, mounted in links 90, 90, set upon shoulder screws 91, 91, connected by bands 92 with wheels 93 set in the levers 94, fulcrumed at 80ª, and held under tension by contractile springs 96, serve to feed the paper against and in contact with the platen 80 (See Figs. 3, 11, 13, 17ᶜ, and 17ᵈ.)

For holding the paper against the platen 80, the following additional means are used, to wit: (see Figs. 17, 17ª, 17ᵇ, 17ᶜ, and 17ᵈ:) 80ª, 80ª, are rods set in the frame 82, parallel with the platen, and castings 80ᵇ, 80ᵇ, slide on these rods. An expansive spring 80ᶜ presses a clamp or brake 80ᵈ, down on one of the rods, thereby opposing a frictional resistance to the movement of the casting 80ᵇ upon the rod 80ª, while leaving it free to move under a sufficient gentle force. A spring finger 80ᵉ is attached to each of the castings 80ᵇ, to press the paper against the platen, and an adjustment screw 80ᶠ serves to vary the tension of the spring finger 80ᵉ, as required. Another casting, 80ᵍ, somewhat similar to the castings 80ᵇ, serves to carry the usual pressure roller 80ʰ, which is pivoted to turn easily in the lever 80ⁱ, which latter is pivoted somewhat tightly to the casting 80ᵍ (the ears 80ᵏ of the lever 80ⁱ, pressing tightly against opposite sides of the casting 80ᵍ, Fig. 17ᵉ,) so that it will remain in the position in which it may be placed.

The interlinear spacing mechanism is similar to well known forms in public use. There is a ratchet wheel 97, attached to one end of the platen 80. A spacing handle 98 fulcrumed at 99 and carrying a dog 100, held normally in engagement with the teeth of the wheel 97, by a spring 100ª, serves, when depressed by the operator, to rotate the platen 80. The shoulder 101 set fast in the handle 98, and moving in a slot 102 formed in the bracket 103, (which bracket is screwed to the carriage frame 82) serves to guide the handle 98, and a cam 104 serves to limit the movement of the handle 98, and, according to the position in which it is set, to regulate whether the platen 80 and the ratchet-wheel 97 shall be rotated one, two, or three teeth, for a narrow, medium, or wide line. A flat spring 105, attached to the carriage frame 82, and bearing against a pin 105ª, set in the handle 98, serves to return said handle to its normal position. The handle 98 is furnished with a curved thumb piece 106, while a finger piece 107, is attached to the carriage frame 82 for greater convenience in making line space and returning carriage to its normal position. A wheel, 108, is fulcrumed upon a shoulder screw 109 at the front of the carriage, to run upon a roller 110, which latter is rotatively mounted on hardened centers 111 in the lugs 112, which rise from opposite sides of the top plate 2. The wheel 108, has sufficient breadth of face to travel upon the roller 110 whether the platen or carriage frame be in the upper case or lower case position.

*Platen shifting mechanism.*—115 is the shift-key, set upon the arm 116 of the rock shaft 117, which rock shaft is mounted in hardened points set in opposite sides of the bed-plate, and is furnished with a shorter arm 118, which is connected by a pull rod 119 with the arm of the shifting lever 120. Said lever is mounted upon a hardened center 121, set in a bracket 122, which latter is screwed to the hanger ring 8. The upper part of the shifting lever 120 travels in a groove, formed by the bent metal guide-piece 123, which latter is secured by two screws to the bracket 122. The upper part of the shifting lever 120 is formed to encircle, in part, the back rod 83 at the rear of the carriage frame, and said rod, as the carriage travels from right to left, slides through the shifting-lever 120, which regulates its position from front to rear of the machine. A contractile spring 124 having one end attached to the arm 116, before mentioned, of the rock-shaft 117, and the other end attached to a pin 125, projecting from the fulcrum plate 4, serves to hold the shifting-lever 120 (with its upper end encircling the back rod 83) normally in its forward position, the top of the shifting lever 120 resting against the guide-piece 123; but when the shift-key 115 and arm 116 are depressed, the arm 118 of the shaft 117, pulling upon the short arm of the shifting-lever 120, throws the upper part of said lever in the direction of the arrow until its motion is arrested by the adjustable stop 126. The shifting-lever, when thus shifted, moves the carriage, (whose back rod 83 it encircles,) with it, thereby shifting the platen from the normal or lower case position to the upper case position.

When it is desired to shift the carriage for some time from the lower case to the upper case position, the effect is produced by moving the cam 127, centered at 128, in the direction of the arrow, Fig. 3.

*Letter-spacing mechanism.*—130 is the dog-carrying lever, which is centered by means of hardened points 131, 131, set in the downward projecting arms of the casting 132 which is screwed to the lower surface of the top-plate at the rear of the machine. The fast dog 133 is screwed fast to the dog-carrying lever 130. The loose dog (or pivoted dog) 134 is hinged at 135 to the loose dog lever 136, which latter is pivoted at 137 to the dog-carrying lever 130. A contractile spring 134ª, Fig. 8ᶜ, serves to hold the loose dog 134, in the normal position illustrated in Fig. 8ᶜ. A contractile spring 138, having one end connected with the loose dog lever 136, and the other with a pin set in the casting 132, tends to move the loose dog and loose dog lever in the opposite direction to that in which the rack-carrying frame 139 (which is hinged to the yoke-piece 84 and to the hinge-and-guide rod 85), and rack 140 are urged by the carriage motor spring arrangement hereinafter described. A contractile spring 141 having one end attached to the dog-carrying lever 130, and the other to a pin projecting downward from the top plate serves to hold the dog-carrying-lever in its normal position with the loose dog 134 in engagement with the rack 140. An arm, 142, adjustable in the shaft of the motor-frame by a screw 143, and connected by a link 144 with the dog-carrying-lever 130 at the point 145, serves when a key is depressed and the circuit of the motor-magnet closed, to give movement to the dogs, so that the loose dog 134 is freed from the rack and the fast dog 133 brought into engagement therewith; whereupon the loose dog, 134, under the influence of the spring 138, moves to the left, as viewed from the back of the machine, one tooth space, and the arm 146 comes in contact with and is arrested by the adjustable stop 147 set in the arm 148, of the rock-shaft 149. When the circuit is broken in the manner before described the dog-carrying-lever 136 returns to its normal position under the influence of the contractile spring 141; the fast dog 133 leaves the rack and the loose dog 134 comes into engagement therewith; whereupon the carriage moves in the direction of the arrow Fig. 8, until its motion is arrested by the loose-dog-lever 136 coming in contact with the stop 150, set in the dog-carrying-lever 130. But if the space-key 151 be depressed simultaneously with the key that makes the last letter of the word said space-key, connected with forward extending arms 152 of the rock-shaft 153, (which rock-shaft is fulcrumed by means of points set in opposite sides of the bed-plate,) raises the rearward extending arm 154 of said rock-shaft and thus through the jack 44ª, arm 45ª and link 155ª, raises the forward-extending arm 155ᵇ of the rock-shaft 149 before mentioned, depressing the rearward extending arm 148 of said rock-shaft, and withdrawing the stop 147 from the path of movement of the arm 146 attached to the loose-dog-lever 136, so that when the dogs are operated by the motor-frame in the manner before described the loose-dog-lever, when freed from the rack, moves a sufficient distance to the left (as viewed from the rear) to clear two teeth of the rack 140, when its further motion is arrested by the adjustable stop-screw 155, set in a lug 156 of the dog-carrying-lever 130.

In the machine illustrated in the drawings, the space-enlarging key 151 corresponding to the usual space-bar of non-electric machines, is meant to be depressed to make the interverbal space simultaneously with the last letter of a word, in which case the dogs are operated by the electro-magnet in the manner before described. To make a single space—a space by itself alone—the key 5ª at the keyboard, is provided, which, like the other keys 5, 5, controls the motor-frame 11, space-mechanism and a type-bar in the manner already described, but with this difference, that the contractile returning spring 60ª, serving for the type-bar-corresponding lever controlled by the key 5ª is so heavy that the type-bar connected therewith does not print; or the same effect may be produced by a stop, arresting said type-bar short of the printing point, so that the carriage moves in the manner already described and a space is made without any letter being printed.

*Ribbon mechanism.*—160 is the spring-box, which is mounted on the sleeve 161, said sleeve is mounted in the lugs 163 and 164 depending from the top-plate. The spring-box carries a coiled spiral spring 165, one end of which is attached to the spring-box near its periphery, while the other end is attached to the hub of the tension-adjusting escapement wheel 166. A pawl 167, centered at 168 serves, in conjunction with the wheel 166, to afford facility for adjusting the tension of the spring 165. A band, 169, passing over a small pulley or roller 170, connects the spring-box with the arm 171, attached to the yoke 84. The result of this construction is that the spring-box tends constantly to pull the carriage to the left as viewed from the front, or to the right as viewed from behind. The ribbon mechanism is propelled by the spring-box when the carriage moves to the left as viewed from the front, but is not propelled by the spring-box when the carriage moves in the reverse direction.

180, 180, are the ribbon spools, and 181 and 182 are the ribbon spool shafts. The ribbon spool shaft 182 is journaled in the lugs 183 and 184, which depend from the top-plate on the right-hand side as viewed from the front. Longitudinal displacement of said shaft is prevented by the set-collars 185, 185; but the left-hand ribbon spool shaft, 181, has one end journaled in the lug 190, depending from the top-plate, and the other journaled in the rear end of the sleeve 161, before mentioned; which sleeve is bored out so that the ribbon shaft 181 does not bear on it except near the rear end. The ribbon spool shaft 181, has attached to it a small miter gear 192, and a similar miter gear 192ª is attached to the other ribbon spool shaft 182. The sleeve, 161, has attached fast to it a larger miter gear 193. At the back of the machine is a shaft 194, journaled in the lugs 195, 195, depending from the top-plate. Said shaft carries a small miter gear 196, (say about one-half the diameter of the miter gear 192ª) to mesh with said miter gear 192ª; said shaft also carries a larger miter gear 197, to mesh with the miter gear 193, carried by the sleeve 161; and when the gear 197 meshes with the gear 193, the gear 196 meshes with the gear 192ª. Attached fast by a set-screw, or in any other suitable fashion, to the sleeve 161, is an escapement wheel 198. A pawl 199, carried by the spring-box 160, and held by a spring 200, causes the wheel 198, sleeve 161, and gear 193, to rotate in the direction of the arrow, Fig. 10ª, when the carriage moves to the left; but when the carriage moves to the right, in returning to its normal position, the pawl 199 slides over the teeth of the escapement wheel 198, without giving movement thereto, and another pawl, 201, fulcrumed on a bracket 202, secured to the bottom of the top-plate, prevents the escapement wheel 198, sleeve 161, and gear 193, from following the return movement of the spring-box 160. On the shaft 194, before mentioned, at the back of the machine, is a miter gear 210, to mesh with the gear 193 before mentioned, attached to the sleeve 161, and a smaller miter gear 211 to mesh with the miter gear 192 attached fast to the end of the ribbon spool shaft 181. Shaft 194 has two grooves cut in it at different positions along its length, to receive a locking-lever 212, and said shaft slides in its bearings in the lugs 195, 195, to permit the locking-lever 212 to be dropped into either one of the grooves, or slots, before mentioned. When the parts occupy the positions illustrated in Fig. 9, the gear 193 attached to the sleeve 161, meshes with the gear 197 on the shaft 194, and the gear 196 on said shaft 194, also meshes with the gear 192ª on the right-hand ribbon spool driving shaft 182, the result of all of which is that the movement communicated from the spring-box to the escapement wheel 198, sleeve 161, and gear 193, is transmitted to the gear 197 and shaft 194, and thence to the gear 196, and so to the gear 192ª, whereby the ribbon is wound on to the right hand ribbon spool 180. But if the locking-lever 212 be lifted and the shaft 194 shoved to the right until the locking-lever drops into the other one of the two grooves before mentioned, the gear 196 and 192ª, and 193 and 197 will no longer mesh; but the gear 193 will mesh with the gear 210, giving movement to said gear and the shaft 194, and the gear 211 carried by said shaft will mesh with the gear 192 attached fast to the left hand ribbon spool driving shaft 181, so that the ribbon will now be wound on to the left hand ribbon spool 180 and off the right-hand ribbon spool 180. In a word, the arrangement is such as before described and illustrated, that by shifting the rod 194 the right-hand or the left-hand ribbon spool driving shaft is made to wind the ribbon onto itself and off of the other; and the ribbon feed may be reversed as desired.

The form of shifting mechanism illustrated in the accompanying drawings is that in which the platen is shifted; but another form of shifting mechanism is well known in the art and in common use, in which the types themselves are shifted instead of the platen. While I prefer the former kind of shifting mechanism, by which the platen is shifted, the other kind, in which the types are shifted, may be used instead, in carrying out my invention. And when, in the statement of claim at the end hereof I use the term shifting mechanism, or other language of similar import, I refer to shifting mechanism broadly and mean to include in that term the various sorts well known in the art, and as well that in which the types are shifted as that in which the platen is shifted.

In some of the paragraphs of claim at the end hereof I speak of a "striker", for giving movement to the movement-receiving arms, type-bar-corresponding levers, or other parts. The motor-frame 11, illustrated in the drawings, is one suitable form of striker, but any other suitable form might be used instead.

In some of the paragraphs of claim at the end hereof I speak of the "movement-receiving ends" of the type-bar-corresponding levers. By the movement-receiving ends of the type-bar-corresponding levers I mean the ends of said levers to which the movement is first communicated, or through which it is communicated to the lever.

As pointed out in previous patents and in pending applications for patents, of mine, some other motor-device than an electromagnet might be used for impelling the type-bars, spacing-mechanism, releasing-mechanism, etc.; for example, a pneumatic motor device might be used of the sort, to mention one suitable form, commonly used in pipe organs to actuate the valves thereof, in so-called pneumatic-actions. The frame, 20, or some similar device, might, in such case, be used to control the valves of such pneumatic power device in the same manner in which the keys of an organ now control the valves of the corresponding pneumatics. Or, obviously, each key might control a valve or valves. But the arrangement of a single motor-controlling frame, as 20, controlled by a plurality of the keys or by all of them, is preferable.

Very obviously, while actuating some of the type-bars by a motor device, as shown, it would be possible to actuate some of them in some other fashion, as, for example, directly by the finger. So, also, some of the type-bars might be operated by one motor-device, and others by another motor-device: Thus, to mention one arrangement, two motor frames may be used, each of, say, half the length of the motor-frame 11, with two circuit-closing frames each like the circuit-closing frame, 20, but of half that length, and two releasing frames, each say, of half the length of the present releasing-frame 30. The effect of this arrangement would be to reduce the weight of the moving parts;

but, on the other hand, would increase the complexity and cost of the machine. But it will be understood, that when I speak of a single motor device actuating type-bars, or a plurality of type-bars, or use other language of similar import, I do not mean to limit myself to a construction in which the motor-device actuates every type-bar of the machine. Hence, when, in the paragraphs of claim at the end hereof, I speak of a plurality of type-bars, without saying a complete set, I do not wish to be limited to a complete set of type-bars.

The releasing-frame 30, might, obviously, be operated by a magnet, or some motor device other than that which impels the type-bars. Thus, to mention one out of several possible constructions, a magnet arranged in parallel or in series with the motor-magnet; or controlled in any other way, by the circuit-closing-frame, or by the keys, might be connected to the releasing-frame 30, so that on the depressing of a key said releasing-frame will act upon the arm 44, to permit the bell-crank 45 and parts controlled thereby, to return to their normal positions. So, also, obviously the spacing mechanism might be operated by some other magnet or motor device than one which actuates type-bars. All which is fully illustrated or explained in previous patents or applications for patents of mine. And, finally, I wish it to be very distinctly understood that many modifications may be made in the details of mechanical construction for embodying my invention, without departing from the essential principles of my invention, which are set forth in the statement of claim at the end hereof; and I wish it to be very clearly understood that it is not my intention to dedicate or abandon any part of my invention to the public, but that I wish full protection for all, and every part of the invention which I have made.

What, therefore, I claim as my invention, and desire to secure by Letters Patent, is:

1. In a type-writing machine and in combination, (a) a multiplicity of type-bars striking to a common printing center; said type-bars being disposed part of them in front of said printing center, and part of them behind said printing center; (b) a set of type-bar-corresponding levers, each receiving movement at one end for the impelling of the corresponding type-bar; said type-bar-corresponding levers being disposed in two groups; the levers of each group being parallel or nearly parallel with the other levers of that group; the levers of one of said groups being connected with the type-bars before mentioned as disposed in front of the printing center, the levers of said group being fulcrumed in front of the printing center; the other group of type-bar-corresponding levers being connected with the type-bars before mentioned as disposed behind the printing center; said levers being fulcrumed behind the printing center; the movement-receiving ends of the type-bar-corresponding levers of the two groups above mentioned lying in proximity to each other, and the levers of the two groups extending in opposite directions from their movement-receiving ends, the levers of the one group extending toward the front of the machine, and the levers of the other group extending toward the rear of the machine.

2. In a type-writing machine and in combination, (a) a set of type-bars striking to a common printing center; said type-bars being disposed part of them in front of said printing center, and part of them behind said printing center; (b) a set of type-bar-corresponding levers, each receiving movement at one end for the impelling of the corresponding type-bar; said type-bar-corresponding levers being disposed in two groups; the levers of one of said groups being connected with the type-bars before mentioned as disposed in front of the printing center, the levers of said group being fulcrumed in front of the printing center; the other group of type-bar corresponding levers being connected with the type-bars before mentioned as disposed behind the printing center; said levers being fulcrumed behind the printing center; the movement-receiving ends of the type-bar-corresponding levers of the two groups above mentioned lying in proximity to each other, and the levers of the two groups extending in opposite directions from their movement-receiving ends, the levers of the one group extending toward the front of the machine, and the levers of the other group extending toward the rear of the machine; (c) motor mechanism for actuating said type-bar-corresponding levers; (d) keys corresponding to the type-bar-corresponding levers aforesaid, a key for each type-bar-corresponding lever; and (e) means, controlled by said keys, whereby the motor mechanism aforesaid is caused to actuate the different type-bars aforesaid, each as required.

3. In a type-writing machine and in combination, (a) a plurality of type-bars disposed in front of the printing center, and each carrying a plurality of type; (b) a plurality of type-bars disposed behind the printing center, and each carrying a plurality of type; (c) a longitudinally-traveling paper-carrier; (d) suitable shifting mechanism, whereby the different types on the type-bars aforesaid are caused to print, as required; and (e) a set of type-bar-corresponding levers, each receiving movement at one end for the impelling of the corresponding type-bar; said type-bar-corresponding levers being disposed in two groups; the levers of each group being parallel or nearly parallel with the other levers of that group; the levers of one of said groups being connected with the type-bars before mentioned as disposed in front of the printing center, the levers of said group being fulcrumed in front of the printing center; the other group of type-bar-corresponding levers being connected with the type-bars before mentioned as disposed behind the printing center; said levers being fulcrumed behind the printing center; the movement-receiving ends of the type-bar-corresponding levers of the two groups above mentioned lying in proximity to each other, and the levers of the two groups extending in opposite directions from their movement-receiving ends, the levers of the one group extending toward the front of the machine, and the levers of the other group extending toward the rear of the machine.

4. In a type-writing machine and in combination, (a) a plurality of type-bars disposed in front of the printing center, and each carrying a plurality of type; (b) a plurality of type-bars disposed behind the printing center, and each carrying a plurality of type; (c) a platen mounted to move longitudinally and to shift transversely; (d) a shift-key and means controlled thereby, for shifting said platen from one printing position to another; (e) a set of type-bar-corresponding levers, each receiving movement at one end for the impelling of the corresponding type-bar; said type-bar-corresponding levers being disposed in two groups; the levers of one of said groups being connected with the type-bars before mentioned as disposed in front of the printing center, the levers of said group being fulcrumed in front of the printing center; the other group of type-bar-corresponding levers being connected with the type-bars before mentioned as disposed behind the printing center; said levers being fulcrumed behind the printing center; the movement-receiving ends of the type-bar-corresponding levers of the two groups above mentioned lying in proximity to each other, and the levers of the two groups extending in opposite directions from their movement-receiving ends, the levers of the one group extending toward the front of the machine, and the levers of the other group extending toward the rear of the machine; (f) motor mechanism for actuating said type-bar-corresponding levers; (g) keys corresponding to the type-bar-corresponding levers aforesaid, a key for each type-bar-corresponding lever; and (h) means, controlled by said keys, whereby the motor mechanism aforesaid is caused to actuate the different type-bars aforesaid, each as required.

5. In a typewriting machine and in combination, (a) a multiplicity of type-bars striking to a common printing center; said type-bars being disposed part of them in front of said printing center, and part of them behind said printing center; and (b) type-bar-corresponding levers, said type-bar-corresponding levers being levers of the first order, each having one end connected with the corresponding type-bar, and receiving movement at the other end for the impelling of said type-bar; said type-bar-corresponding levers being disposed in two groups; the levers of each group being parallel or nearly parallel with the other levers of that group; the levers of one of said groups being connected with the type-bars before mentioned as disposed in front of the printing center; the levers of said group having their fulcrums in front of the printing center; the other group of type-bar-corresponding levers being connected with the type-bars before mentioned as disposed behind the printing center, and having their fulcrums also behind the printing center; the movement-receiving ends of the type-bar-corresponding levers of the two groups before mentioned lying in proximity to each other, and the levers of the two groups extending in opposite directions from their movement-receiving ends, the levers of the one group extending toward the front of the machine, and the levers of the other group extending toward the rear of the machine.

6. In a type-writing machine and in combination, (a) a set of type-bars striking to a common printing center; said type-bars being disposed part of them in front of said printing center, and part of them behind said printing center; (b) a set of type-bar-corresponding levers, said type-bar-corresponding levers being levers of the first order, each having one end connected with the corresponding type-bar, and receiving movement at the other end for the impelling of said type-bar; said type-bar-corresponding levers being disposed in two groups; the levers of one of said groups being connected with the type-bars before mentioned as disposed in front of the printing center; the levers of said group having their fulcrums in front of the printing center; the other group of type-bar-corresponding levers being connected with the type-bars before mentioned as disposed behind the printing center, and having their fulcrums also behind the printing center; the movement-receiving ends of the type-bar-corresponding levers of the two groups before mentioned lying in proximity to each other, and the levers of the two groups extending in opposite directions from their movement-receiving ends, the levers of the one group extending toward the front of the machine, and the levers of the other group extending toward the rear of the machine; (c) motor mechanism for actuating said type-bar-corresponding levers; (d) keys corresponding to the type-bar-corresponding levers aforesaid, a key for each type-bar-corresponding lever; and (e) means, controlled by said keys, whereby the motor mechanism aforesaid is caused to actuate the different type-bars aforesaid, each as required.

7. In a type-writing machine and in combination, (a) a multiplicity of type-bars, striking to a common printing center; said type-bars being disposed partly in front of said printing center, and partly behind said printing center; and (b) a set of type-bar-corresponding levers, disposed beneath the type-bars, and each connected with the corresponding type-bar and giving movement thereto; said type-bar-corresponding levers each having a movement-receiving arm pivoted to it at one end, wherethrough movement is communicated to said type-bar-corresponding lever for the actuating of the type-bar with which it is connected; said type-bar-corresponding levers being disposed in two groups; the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the type-bar-corresponding levers of the other group extend backward from their movement-receiving arms.

8. In a type-writing machine and in combination, (a) a plurality of type-bars disposed in front of the printing center, and each carrying a plurality of type; (b) a plurality of type-bars disposed behind the printing center, and each carrying a plurality of type; (c) a paper-carrier, mounted to travel longitudinally as the printing progresses; (d) suitable shifting mechanism, whereby the different types on a type-bar are caused to print as required; (e) a set of type-bar-corresponding levers, each connected with the corresponding type-bar and giving movement thereto; said type-bar-corresponding levers each having a movement-receiving arm pivoted to it at one end, wherethrough movement is communicated to said type-bar-corresponding lever for the actuating of the type-bar with which it is connected; said type-bar-corresponding levers being disposed in two groups; the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups mentioned being disposed in proximity to each other; the type-bar-corresponding levers of the one group extending forward from their movement-receiving arms, while the type-bar-corresponding levers of the other group extend backward from their movement-receiving arms; (f) keys controlling said movement-receiving arms; and (g) means for actuating said movement-receiving arms, to give movement to the type-bar-corresponding levers and type-bars with which they are connected.

9. In a typewriting machine and in combination, (a) a plurality of type-bars disposed in front of the printing center, and each carrying a plurality of type; (b) a plurality of type-bars disposed behind the printing center, and each carrying a plurality of type; (c) a platen, mounted to move longitudinally and to shift transversely; (d) a shift-key for shifting said platen from one printing position to another; (e) type-bar-corresponding levers, each connected with the corresponding type-bar and giving movement thereto; said type-bar-corresponding levers each having a movement-receiving arm pivoted to it at one end, wherethrough movement is communicated to said type-bar-corresponding lever for the actuating of the type-bar with which it is connected; said type-bar-corresponding levers being disposed in two groups; the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups mentioned being disposed in proximity to each other; the type-bar-corresponding levers of the one group extending forward from their movement-receiving arms, while the type-bar-corresponding levers of the other group extend backward from their movement-receiving arms; (f) keys controlling said movement-receiving arms; and (g) motor mechanism, controlled by the keys aforesaid, and serving to actuate the movement - receiving arms aforesaid, thereby to give movement to the type-bar-corresponding levers and the type-bars with which said arms are connected.

10. In a type-writing machine and in combination, (*a*) a plurality of type-bars, striking to a common printing center; said type-bars being disposed, some of them in front of said printing center, and some of them behind said printing center; (*b*) a set of type-bar-corresponding levers, each connected with the corresponding type-bar to communicate movement thereto; said type-bar - corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar - corresponding levers being connected with the type-bars before mentioned as disposed behind the printing center; said levers being also fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; and (*c*) a frame, or lever, acting to give movement to a plurality of the movement-receiving arms pivoted to the two groups of type-bar-corresponding levers aforesaid thereby to actuate the corresponding type bars, each as required.

11. In a type-writing machine and in combination, (*a*) a plurality of type-bars, striking to a common printing center; said type-bars being disposed some of them in front of said printing center, and some of them behind said printing center; (*b*) a set of type-bar-corresponding levers, each connected with the corresponding type-bar to communicate movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being also fulcrumed behind the printing center; the movement-receiving arms pivoted to the type-bar-corresponding levers of the two groups before mentioned being disposed in proximity to each other; the type - bar - corresponding levers of the one group extending forward from their movement-receiving arms, while the levers of the other group extend backward from their movement-receiving arms; (*c*) a frame, or lever, acting to give movement to a plurality of the movement-receiving arms pivoted to the two groups of type-bar-corresponding levers aforesaid thereby to actuate the corresponding type-bars, each as required; and (*d*) means whereby said arms are brought into operative relation with the frame or lever aforesaid, each as required.

12. In a type-writing machine and in combination, (*a*) a plurality of type-bars, striking to a common printing center; said type-bars being disposed in front of said printing center; (*b*) a plurality of type-bars disposed behind the printing center aforesaid, and striking thereto; (*c*) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type - bar - corresponding levers of the two groups before mentioned being disposed in proximity to each other; the type-bar-corresponding levers of the one group extending forward from their movement-receiving arms, while the levers of the other group extend backward from their movement-receiving arms; (*d*) motor mechanism for actuating the movement-receiving arms aforesaid, thereby to give movement to the type-bar-corresponding levers and type-bars with which said arms are connected; (*e*) keys; and (*f*) means controlled thereby, whereby said arms are brought into operative relation with the motor mechanism aforesaid, to receive movement therefrom, each as required.

13. In a type-writing machine and in combination, (a) a plurality of type-bars, striking to a common printing center; said type-bars being disposed in front of said printing center; (b) a plurality of type-bars disposed behind the printing center aforesaid, and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; (d) a frame, acting to give movement to some or all of the movement-receiving arms pivoted to the two groups of type-bar-corresponding levers aforesaid; (e) keys, corresponding to said movement-receiving arms; (f) means connecting each key with the corresponding movement-receiving arm, whereby said key, when depressed, brings said movement-receiving arm into operative relation with the frame aforesaid, to receive movement therefrom; and (g) means for actuating said frame, controlled by the keys aforesaid.

14. In a type-writing machine and in combination, (a) a plurality of type-bars, striking to a common printing center; said type-bars being disposed in front of said printing center; (b) a plurality of type-bars disposed behind the printing center aforesaid, and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement receiving arms, while the levers of the other group extend backward from their movement-receiving arms; (d) a frame, acting to give movement to some or all of the movement-receiving arms pivoted to the two groups of type-bar-corresponding levers aforesaid; (e) keys, corresponding to said movement-receiving arms; (f) means connecting each key with the corresponding movement-receiving arm, whereby said key, when depressed, brings said movement-receiving arm into operative relation with the frame aforesaid, to receive movement therefrom; (g) an electromagnet for actuating said frame; and (h) means controlled by the keys aforesaid for operating the electro-magnet aforesaid.

15. In a type-writing machine and in combination, (a) a plurality of type-bars, striking to a common printing center; said type-bars being disposed in front of said printing center; (b) a plurality of type-bars disposed behind the printing center aforesaid, and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; (d) a frame, acting to give movement to some or all of the movement-receiving arms pivoted to the two groups of type-bar-corresponding levers aforesaid; (e) keys, corresponding to said movement-receiving arms; (f) means connecting each key with the corresponding movement-receiving arm, whereby said key, when depressed, brings said movement-receiving arm into operative relation with the frame aforesaid, to receive movement therefrom; (g) an electro-magnet for actuating said frame; and (h) a frame, operated by a plurality of the keys aforesaid, and serving to control the electromagnet aforesaid.

16. In a type-writing machine and in combination, (a) a plurality of type-bars, striking to a common printing center; said type-bars being disposed in front of said printing center; (b) a plurality of type-bars disposed behind the printing center aforesaid and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; (d) a frame, or lever, acting to give movement to some or all of the movement-receiving arms pivoted to the two groups of type-bar-corresponding levers aforesaid; (e) bell-cranks, corresponding to said movement-receiving arms; (f) connections between said arms and said bell-cranks; (g) keys, corresponding to said bell-cranks; and (h) arms connecting the bell-cranks aforesaid with the corresponding keys, an arm for each key and bell-crank; said arm being pivoted to one of the two parts aforesaid that it connects, and adapted to be connected with and disconnected from the other, as required.

17. In a type-writing machine and in combination, (a) a plurality of type-bars, striking to a common printing center; said type-bars being disposed in front of said printing center; (b) a plurality of type-bars disposed behind the printing center aforesaid and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; (d) a frame, or lever, acting to give movement to some or all of the movement-receiving arms pivoted to the two groups of type-bar-corresponding levers aforesaid; (e) bell-cranks, corresponding to said movement-receiving arms; (f) connections between said arms and said bell-cranks; (g) keys, corresponding to said bell-cranks; and (h) arms, pivoted to said bell-cranks to receive movement from said keys.

18. In a type-writing machine and in combination, (a) a plurality of type-bars, striking to a common printing center; said type-bars being disposed in front of said printing center; (b) a plurality of type-bars disposed behind the printing center aforesaid and striking thereto; (c) type-bar-corresponding levers, each connected with the corresponding type-bar and giving movement thereto; said type-bar-corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center; the other group of type-bar-corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement receiving arms; (d) a striker acting to give movement to some or all of the movement-receiving arms pivoted to the two groups of type-bar-corresponding levers aforesaid; (e) bell-cranks, corresponding to said movement-receiving arms; (f) connections between said arms and said bell-cranks; (g) keys, corresponding to said bell-cranks; (h) arms connecting the bell cranks with the corresponding keys, an arm for each key and bell-crank; said arm being pivoted to one of the two parts aforesaid that it connects, and adapted to be connected with and disconnected from the other, as required; (i) a motor device, for actuating the striker aforesaid; (k) a motor-controlling device, operated by the bell-cranks aforesaid; and (l) means, acting to disconnect the arms before mentioned as connecting the bell-cranks aforesaid with the keys aforesaid, from one of said parts, when said keys are depressed, whereby parts controlled by a key are left free to return to their normal positions in advance of the key, while the pressure upon the key is maintained.

19. In a type-writing machine and in combination, (a) a plurality of type-bars, striking to a common printing center; said type-bars being disposed some of them in front of said printing center, and some of them behind said printing center; (b) a set of type-bar-corresponding levers, each connected with the corresponding type-bar and giving movement thereto; said type-bar corresponding levers each having a movement-receiving arm pivoted to it, wherethrough movement is communicated to said type-bar-corresponding lever for the actuating of the type-bar with which it is connected; said type-bar-corresponding levers being disposed in two groups, the levers of one of said groups being connected with the type-bars before mentioned as disposed in front of the printing center; the levers of said group being fulcrumed in front of the printing center, the other group of type-bar corresponding levers being connected with the type-bars before mentioned as disposed behind the printing center; said levers being fulcrumed behind the printing center; the movement-receiving arms pivoted to the type-bar-corresponding levers of the two groups before mentioned being disposed in proximity to each other; the type-bar-corresponding levers of the one group extending forward from their movement-receiving arms, while the levers of the other group extend backward from their movement-receiving arms; (c) a striker, acting to give movement to some or all of the movement-receiving arms pivoted to the two groups of type-bar-corresponding levers aforesaid; (d) bell-cranks, as 45, 45; (e) arms, as 49, 49, actuated by said bell-cranks; (f) links, connecting the arms last mentioned with the movement-receiving arms aforesaid; (g) means, connecting the bell-cranks aforesaid with the keys aforesaid; (h) a motor device for actuating the frame aforesaid; (i) a motor-controlling device actuated by the bell-cranks aforesaid; and (k) a releasing device, acting to permit the bell-cranks aforesaid to return to their normal positions independently of the keys.

20. In a type-writing machine, and in combination, (a) a bed-plate; (b) a top-plate; (c) a carriage, and type-bars supported by said top-plate; (d) standards rising from said bed-plate to support said top-plate; (e) an elliptical fulcrum-plate, attached to said standards; (f) type-bar-corresponding levers of varying lengths, supported by said fulcrum-plate; and (g) connections between said type-bar-corresponding levers and the type-bars aforesaid with which they respectively correspond.

21. In a type-writing machine and in combination, (a) a bed-plate; (b) a top-plate; (c) a carriage, and type-bars supported by said top-plate; (d) standards rising from said bed-plate to support said top-plate; (e) an elliptical fulcrum-plate, attached to said standards; (f) type-bar-corresponding levers of varying lengths, supported by said fulcrum-plate; (g) connections between said type-bar-corresponding levers and the type-bars aforesaid with which they respectively correspond; (h) movement-receiving arms pivoted to said type-bar-corresponding levers; (i) a striker for giving movement to said arms and the type-bar-corresponding levers and type-bars connected therewith; and (k) a magnet for actuating said striker.

22. In a type-writing machine and in combination, (a) a fulcrum-frame, with the fulcrums disposed in elliptical fashion; (b) type-bar-corresponding levers set in said fulcrums; said levers being levers of the first order, and diminishing in length on each side of the center of the fulcrum-frame aforesaid; (c) type-bars striking to a common printing center; (d) links connecting the type-bar-corresponding levers aforesaid with the appropriate type-bars; (e) motor mechanism for actuating the type-bar-corresponding levers aforesaid thereby to impel the type-bars aforesaid; and (f) keys, and means controlled thereby whereby said motor-mechanism is caused to give movement to the different type-bar-corresponding levers aforesaid, each as required.

23. In a type-writing machine and in combination, (a) a fulcrum-frame, with the fulcrums disposed in elliptical fashion; (b) type-bar-corresponding levers set in said fulcrums; said levers being levers of the first order, and diminishing in length on each side of the center of the fulcrum-frame aforesaid; (c) type-bars striking to a common printing center; (d) links connecting the type-bar-corresponding levers aforesaid with the appropriate type-bars; (e) movement-receiving arms, pivoted to said type-bar-corresponding levers; (f) a striker for acting upon said movement-receiving arms to give movement to the type-bar-corresponding levers to which they are pivoted; (g) keys, each controlling one of said movements-receiving arms; and (h) a motor device for actuating the striker aforesaid, said motor device being controlled by the keys.

24. In a type-writing machine and in combination, (a) a fulcrum-frame, with the fulcrums disposed in elliptical fashion; (b) type-bar-corresponding levers set in said fulcrums; said levers being levers of the first order, and diminishing in length on each side of the center of the fulcrum-frame aforesaid; (c) type-bars striking to a common printing center; (d) links connecting the type-bar-corresponding levers aforesaid with the appropriate type-bars; (e) movement-receiving arms pivoted to said type-bar-corresponding levers; (f) a motor-device for giving movement to a plurality of the movement-receiving arms aforesaid, with the type-bar-corresponding levers and type-bars connected therewith; (g) keys, each controlling one of said movement-receiving arms, to bring it into operative relation with the motor-device aforesaid to receive movement therefrom; and (h) a motor-controlling device operated by a plurality of the keys aforesaid, and serving, when a key is depressed, to bring the motor-device aforesaid into action.

25. In combination, in a typewriting machine (a) a plurality of type-bars, striking to a common printing center; (b) keys, corresponding with said type-bars, a key for each type-bar; (c) motor mechanism for impelling said type-bar; (d) means controlled by the keys aforesaid, whereby the different type-bars aforesaid are caused to be impelled by the motor mechanism aforesaid, each type-bar as required; (e) releasing mechanism, whereby, when a key is depressed to print, the type-bar controlled by such key is left free to return toward its normal position in advance of the release of such key, so that another key may be depressed to print while the key first depressed is still held down; (f) a space-enlarger whereby an enlarged space is caused to be made, sufficient for a letter space and an interverbal space; (g) a space-bar in front of the keyboard, controlling said space enlarger; and (h) a releasing device, whereby said space enlarger is left free to return toward its normal position, in advance of the release of the space-bar controlling it; the whole being constructed, arranged and operating in such a manner that when a type-bar-controlling key is depressed to print a letter and the space-bar aforesaid depressed simultaneously therewith, to cause an interverbal space to be made, another key can be depressed to print in advance of the release of the printing key and the space-bar just depressed, without causing an interverbal space to be made after the second letter printed.

26. In a type-writing machine and in combination, (a) type-bars; (b) keys, corresponding to said type-bars; a key for each type bar, (c) a frame or lever for giving movement to said type-bars; (d) a motor device for impelling said frame or lever; (e) means, controlled by the keys aforesaid whereby each key, when depressed, brings the corresponding type-bar into operative relation with the frame aforesaid to receive movement therefrom; (f) means, controlled by the keys aforesaid, serving, when a key is depressed, to bring the motor-device aforesaid, into action, to impel the frame aforesaid; (g) a space-bar, disposed in front of the keys aforesaid; (h) spacing mechanism whereby the interverbal spaces are made; and (i) means, controlled by the space-bar, aforesaid, acting when said space-bar is depressed simultaneously with one of the keys aforesaid, to cause the making of an interverbal space, in addition to the usual space for a letter.

27. In a type-writing machine and in combination, (a) a plurality of type-bars; (b) keys, corresponding with said type-bars; (c) a motor-device for giving movement to said type-bars; (d) means, controlled by the keys aforesaid, whereby the motor-device aforesaid is made to actuate the different type-bars aforesaid, each as required; (e) spacing mechanism, actuated by the type-bar-impelling motor-device above mentioned whereby the spaces for the successive letters are caused to be produced as the letters are printed; and (f) a space-bar, disposed in front of the keys aforesaid, and connected with the spacing mechanism aforesaid and operating, when depressed simultaneously with a letter-key to cause the making of an interverbal space as well as the space for a letter.

28. In a type-writing machine and in combination, (a) type-bars, striking to a common printing center; (b) motor mechanism, for impelling said type-bars; (c) keys equal in number of said typebars, and means controlled by said keys whereby the different type-bars aforesaid are caused to be actuated by the motor mechanism aforesaid, each type-bar as required; (d) spacing mechanism; (e) a space-enlarger, forming part of said motor-mechanism, by the action whereof the carriage is caused to move a double space; and (f) a space-bar disposed in front of the keys aforesaid, and controlling the space-enlarger aforesaid.

29. In a type-writing machine and in combination, (a) type-bars, striking to a common printing center; (b) motor mechanism, for impelling said type-bars; (c) keys equal in number to said typebars, and means controlled by said keys whereby the different type-bars aforesaid are caused to be actuated by the motor mechanism aforesaid, each type-bar as required; (d) spacing mechanism, actuated by suitable motor mechanism; said spacing mechanism including a space-enlarger by the action whereof the paper carriage is caused or permitted to move a double space; and (e) a space-bar disposed in front of the keys aforesaid, and controlling said space-enlarger.

30. In a type-writing machine and in combination, (a) type-bars, striking to a common printing center; (b) motor mechanism, for impelling said type-bars; (c) keys, and means controlled thereby whereby the different type-bars aforesaid are caused to be actuated by the motor mechanism aforesaid, each type-bar as required; (d) spacing mechanism; (e) a space-enlarger, forming part of said motor mechanism, by the action whereof the carriage is caused to move a double space; (f) a space-bar disposed in front of the keys aforesaid, and controlling the space-enlarger aforesaid; and (g) a releasing device whereby said space-enlarger is left free to return to its normal position in advance of the release of the space-bar aforesaid.

31. In a type-writing machine and in combination, (a) a plurality of type-bars striking to a common printing center; (b) a striker, for impelling said type-bar; (c) keys, and means controlled thereby whereby said striker is made to act upon the different type-bars aforesaid, each type-bar as required; (d) a motor-device for actuating said striker; (e) spacing mechanism, actuated by the motor device aforesaid; (f) a space-enlarger for said spacing mechanism, whereby the paper is caused to move an extra distance; (g) a space-bar disposed in front of the keys aforesaid, said space-bar actuating the space enlarger aforesaid; and (h) a releasing device, actuated by the motor device aforesaid, and whereby said space-enlarger is left free to return toward its normal position in advance of the release of the space-bar aforesaid.

32. In a type-writing machine and in combination, (a) a plurality of type-bars; (b) keys, corresponding to said type-bars; (c) motor mechanism controlled by said keys, and serving to actuate said type-bars; (d) a paper carriage and spacing mechanism therefor, including a space-enlarger; (e) a space-bar, disposed in front of the keys aforesaid; (f) a pivoted arm intermediate said space-bar and said space-enlarger to form a releasable connection intermediate the two; and (g) a releasing device, acting on said pivoted arm, to permit the return of the space-enlarger toward its normal position in advance of the release of the space-bar aforesaid.

33. In a type-writing machine and in combination, a space-bar 151 and rock shaft 153 operated thereby, having an arm 154; a loose dog; a stop for said loose dog; a connection intermediate said loose-dog stop and the arm 154, said connection including a latch.

34. In a type-writing machine and in combination, a space-bar 151, and rock shaft 153 operated thereby, having an arm 154; a loose dog; a stop for said loose dog; a connection intermediate said loose dog stop and the arm 154 aforesaid, said connection including a latch, and means acting upon said latch to permit the return of the loose-dog stop to its normal position in advance of the release of the space-bar.

35. In a typewriting machine, and in combination, a space-bar 151; a rock shaft 153, operated thereby and having an arm 154; a loose dog; a stop for said loose dog; a rock shaft, having an arm carrying said loose-dog stop; a pivoted lever; a latch, pivoted to said lever, said latch receiving movement from the arm 154 of the rock shaft 153, and giving movement to the lever to which it is pivoted; a connection between said lever and the loose dog stop aforesaid; and means acting upon the latch to permit the return of the pivoted lever aforesaid and the loose-dog stop connected therewith, to their normal positions in advance of the release of the space-bar.

36. In combination, in a typewriting machine, (a) a type-bar; (b) a type-bar impelling frame; the type-bar aforesaid being normally disconnected from said frame; (c) a motor device for giving movement to said type-bar-impelling frame; (d) a key at the key-board; (e) means controlled by said key and acting when said key is depressed both to connect the type-bar aforesaid with the type-bar impelling frame aforesaid and also to bring the motor device aforesaid into action to give movement to said frame whereby the type-bar is thrown toward the printing point; and (f) a printing-strength-regulating device, connected with the motor device aforesaid and serving to control the velocity of motion of the type-bar toward the printing point and the strength of the printing blow.

37. In combination, in a type-writing machine, (a) a type-bar; (b) a type-bar-impelling frame; the type-bar aforesaid being normally disconnected from said frame; (c) an electro-magnet for giving movement to said type-bar-impelling frame; (d) a key at the key-board; (e) means controlled by said key, acting when said key is depressed, both to connect the type-bar aforesaid with the type-bar-impelling frame aforesaid and also to bring the magnet aforesaid into action to give movement to said frame, whereby the type-bar is thrown toward the printing point; and (f) a rheostat, connected with the magnet aforesaid and acting to govern the power of the printing effected by said magnet.

38. In combination, in a typewriting machine, (a) a type-bar; (b) a type-bar impelling frame, the type-bar aforesaid being normally disconnected from said frame, and said frame being normally at rest; (c) a movement-receiving member connected with said type-bar for the purpose of receiving movement from said frame; (d) a motor-device for giving movement to said frame; (e) a key at the key-board, acting when depressed to bring the movement-receiving member, connected with the type-bar aforesaid, into operative relation with the type-bar impelling-frame aforesaid; (f) a motor-controlling device, for the motor aforesaid, said motor-controlling device being also controlled by the key whereby when said key is depressed, the motor aforesaid is brought into action to give movement to the type-bar-impelling frame and to the type-bar aforesaid; and (g) a printing-strength-regulating device, connected with the motor device aforesaid and serving to control the velocity of motion of the type-bar aforesaid toward the printing point and the strength of its printing blow.

39. In combination, in a typewriting machine, (a) a type-bar; (b) a type-bar impelling frame, the type-bar aforesaid being normally disconnected from said frame, and said frame being normally at rest; (c) a movement-receiving member, connected with said type-bar for the purpose of receiving movement from said frame; (d) an electro-magnet for giving movement to said frame; (e) a key at the key-board, acting when depressed to bring the movement-receiving member connected with the type-bar aforesaid into operative relation with the type-bar impelling-frame aforesaid; (f) means for closing the circuit of said electro-magnet, also controlled by said key, whereby when said key is depressed, said magnet is brought into action to give movement to the type-bar impelling frame and to the type-bar aforesaid; and (g) a printing-strength-regulating device, connected with the electro-magnet aforesaid and serving to control the velocity of motion of the type-bar aforesaid toward the printing point and the strength of its printing blow.

40. In combination in a type-writing machine, (a) a type-bar; (b) a type-bar-impelling frame, the type-bar being normally disconnected from said frame; (c) a movement-receiving member connected with said type-bar for the purpose of receiving movement from said frame; (d) an electro-magnet for giving movement to said frame; (e) a key at the key-board, acting when depressed to bring the movement-receiving member connected with the type-bar aforesaid, into operative relation with the type-bar-impelling frame aforesaid; (f) means for closing the circuit of said magnet, also controlled by said key, whereby when said key is depressed, said magnet is brought into action to give movement to the type-bar-impelling frame and to the type-bar aforesaid; and (g) resistance-varying means connected with the magnet aforesaid and acting to govern the force of its printing blow; whereby the power of printing is controllable at will, independently of the touch upon the key.

41. In combination in a type-writing machine, (a) a type-bar; (b) a type-bar-impelling frame, the type-bar aforesaid being normally disconnected from said frame; (c) a lever connected with the type-bar aforesaid; (d) a movement-receiving member pivoted to said lever, and serving to take motion from the frame aforesaid for the impelling of the type-bar; (e) a key at the key-board, acting when depressed, to connect the movement-receiving member aforesaid with the type-bar-impelling frame aforesaid; (f) an electro-magnet also controlled by said key, and serving when said key is depressed to give movement to said frame; and (g) resistance-varying means connected with the magnet aforesaid and acting to govern the force of its action upon the type-bar, whereby the power of printing is made to be controllable at will independently of the touch upon the key.

42. In combination, in a type-writing machine, (a) a type-bar; (b) an electro-magnet for actuating said type-bar; (c) a key at the key-board controlling the circuit of said magnet, and acting, when depressed, to cause said magnet to impel said type-bar; (*d*) a rheostat in the circuit of the magnet aforesaid, for governing the power of the printing blow of the type-bar aforesaid; and (*e*) means acting to break the circuit of the magnet aforesaid, in advance of the release of the key aforesaid; whereby the type-bar is permitted to return toward its normal position in advance of the release of the key.

43. In combination, in a type-writing machine, (*a*) a type-bar; (*b*) a type-bar-impelling frame; the type-bar aforesaid being normally disconnected from said frame; (*c*) and electro-magnet for giving movement to said type-bar-impelling frame; (*d*) a key at the key-board; (*e*) means controlled by said key, acting when said key is depressed, both to connect the type-bar aforesaid with the type-bar-impelling frame aforesaid and also to bring the magnet aforesaid into action to give movement to said frame, whereby the type-bar is thrown toward the printing point; (*f*) a rheostat, connected with the magnet aforesaid and acting to govern the power of the printing effected by said magnet; and (*g*) means acting to break the circuit of the magnet aforesaid in advance of the release of the key aforesaid; whereby the type-bar is permitted to return toward its normal position in advance of the release of the key.

44. In combination in a type-writing machine, (*a*) a type-bar; (*b*) a type-bar-impelling frame, the type-bar being normally disconnected from said frame; (*c*) a movement-receiving member connected with said type-bar for the purpose of receiving movement from said frame; (*d*) an electro-magnet for giving movement to said frame; (*e*) a key at the key-board, acting when depressed to bring the movement-receiving member connected with the type-bar aforesaid, into operative relation with the type-bar-impelling frame aforesaid; (*f*) means for closing the circuit of said magnet, also controlled by said key, whereby when said key is depressed, said magnet is brought into action to give movement to the type-bar-impelling frame and to the type-bar aforesaid; (*g*) resistance-varying means connected with the magnet aforesaid and acting to govern the force of its printing blow; whereby the power of printing is controllable at will, independently of the touch upon the key; and (*h*) means acting to break the circuit of the magnet aforesaid in advance of the release of the key aforesaid; whereby the type-bar is permitted to return toward its normal position in advance of the release of the key.

45. In combination in a type-writing machine, (*a*) a type-bar; (*b*) a type-bar-impelling frame, the type-bar aforesaid being normally disconnected from said frame; (*c*) a lever connected with the type-bar aforesaid; (*d*) a movement-receiving member pivoted to said lever, and serving to take motion from the frame aforesaid for the impelling of the type-bar; (*e*) a key at the keyboard, acting when depressed, to connect the movement-receiving member aforesaid with the type-bar-impelling frame aforesaid; (*f*) an electro-magnet also controlled by said key, and serving when said key is depressed to give movement to said frame; (*g*) resistance-varying means connected with the magnet aforesaid and acting to govern the force of its action upon the type-bar, whereby the power of printing is made to be controllable at will independently of the touch upon the key; and (*h*) means acting to break the circuit of the magnet aforesaid in advance of the release of the key aforesaid; whereby the type bar is permitted to return toward its normal position in advance of the release of the key.

46. In a type-writing machine and in combination, (*a*) a plurality of type-bars striking to a common printing point; (*b*) an electro-magnet for impelling said type-bars; (*c*) keys, serving to close the circuit of said electro-magnet; (*d*) an automatic circuit-breaker, operating to break the circuit of the type-bar-impelling electro-magnet aforesaid an instant after the depressing of a key and while the pressure on the key is maintained, so that the type-bar controlled by said key is left free to retreat from the printing point after the delivery of its blow and while the key controlling it is held down; and (*e*) a resistance-varying device connected with the magnet aforesaid and operating to govern the power of the printing blow; whereby the weight of the printing is electrically controlled and made to be independent of the touch upon the key.

47. In combination in a type-writing machine, (*a*) a plurality of type-bars striking to a common printing center; (*b*) an electro-magnet for actuating said type-bars, each as required; said type-bars being normally disconnected from said magnet; (*c*) keys for controlling with a single action the type-bars aforesaid, each type-bar as required; (*d*) means controlled by said keys, acting when one of said keys is depressed, to bring the type-bar controlled by said key into operative relation with the electro-magnet aforesaid to receive movement therefrom, and to bring said magnet into action to operate said type-bar; and (*e*) a resistance-varying device connected with said magnet and operating to govern the force of the printing blow; whereby the power of printing is controlled electrically and made to be independent of the touch upon the key.

48. In combination in a type-writing machine, (*a*) a plurality of type-bars striking to a common printing-center; (*b*) an electro-magnet for actuating said type-bars, each as required; (*c*) keys for controlling with a single action the type-bars aforesaid, each type-bar as required; (*d*) means controlled by said keys acting, when one of said keys is depressed to bring the type-bar controlled by said key into operative relation with the electro-magnet aforesaid to receive movement therefrom and to bring said magnet into action to operate said type-bar, the keys aforesaid acting solely, when depressed, to connect the type-bars with the magnet and to bring said magnet into action, said magnet thereupon operating to impel the type-bar from its normal position to the printing-center, independently of the force exerted by the operator upon the key, whereby when a key is depressed the appropriate type-bar is actuated and the type carried thereby thrown from its normal position toward the printing-center by means of a force other than that exerted by the operator upon the key, the touch is made to be light, and the strength of the printing made to be independent of the pressure exerted by the operator upon the key; and (*e*) a rheostat connected with the electro-magnet aforesaid.

49. In combination in a type-writing machine, (*a*) a plurality of type-bars striking to a common printing-center; (*b*) an electro-magnet for actuating said type-bars, each as required; said electro-magnet being normally inactive and said type-bars being normally disconnected therefrom; (*c*) keys corresponding to the type-bars actuated by the electro-magnet aforesaid, a key for each such type-bar; (*d*) means controlled by said keys, acting when one of said keys is depressed to bring the type-bar with which such key corresponds into operative relation with the electro-magnet aforesaid, to receive movement therefrom, and to bring said magnet into action to operate said type-bar; and (*e*) a rheostat connected with the magnet aforesaid.

50. In combination in a type-writing machine, (*a*) a plurality of type-bars, striking to a common printing-center; (*b*) an electro-magnet for actuating said type-bars, to throw said type-bars, each as required, from their normal positions to their printing-center; said electro-magnet being normally inactive and said type-bars being normally disconnected therefrom; (*c*) keys, corresponding to the type-bars actuated by the electro-magnet aforesaid, a key for each such type-bar; and means controlled by said keys, acting when one of said keys is depressed, to bring the type-bar with which such key corresponds into operative relation with the electro-magnet aforesaid to receive movement therefrom, and to bring said magnet into action to operate said type-bar; whereby, when a key is depressed the corresponding type-bar is actuated, and the type carried thereby thrown from its normal position toward the printing-center by a force other than that exerted upon the key, the touch made to be light, and the strength of the printing made to be independent of the pressure exerted by the operator; and (*d*) a rheostat connected with the electro-magnet aforesaid, whereby the strength of printing may be controlled electrically.

51. In combination in a type-writing machine, (*a*) a plurality of type-bars striking to a common printing-center; (*b*) an electro-magnet for actuating said type-bars, to throw said type-bars, each as required, from their normal positions to their printing-center; said electro-magnet being normally inactive and said type-bars being normally disconnected therefrom; (*c*) keys at the keyboard; (*d*) means controlled by said keys, acting when one of said keys is depressed, to bring the type-bar with which such key corresponds, into operative relation with the electro-magnet aforesaid to receive movement therefrom; (*e*) a circuit-controlling device common to a plurality of the keys aforesaid, and operated by them, and acting when any of said keys is depressed, to bring the electro-magnet aforesaid into action to operate the type-bar corresponding to the key depressed, whereby said type-bar is actuated and the type thrown from its normal position toward the printing-center, by means of a force other than that exerted by the operator upon the key, the touch made to be light, and the strength of the printing made to be independent of the pressure exerted upon the key; and (*f*) a rheostat connected with the magnet aforesaid, whereby the power of the printing blow of the type-bar may be varied.

52. In combination, in a type-writing machine, (*a*) a plurality of type-bars striking to a common printing-center; (*b*) an electro-magnet for actuating all said type-bars, to throw said type-bars, each as required, from its normal position to the printing center; (*c*) movement-receiving members for the type-bars actuated by the electro-magnet aforesaid, a movement-receiving member for each such type-bar, suitably connected with said type-bar, and serving to receive movement from the electro-magnet aforesaid for the impelling of said type-bar; said movement-receiving member being normally disconnected from the electro-magnet aforesaid; (*d*) keys, corresponding to the type-bars aforesaid, a key for each type-bar, and each acting, when depressed, to cause the movement-receiving member connected with the type-bar corresponding to such key, to come into operative relation with the electro-magnet aforesaid, to receive movement therefrom; (*e*) a circuit-controlling device, operated by a plurality of the keys aforesaid, serving to control the electro-magnet aforesaid; and (f) a rheostat connected with the electro-magnet aforesaid, whereby the power of the printing may be governed.

53. In combination in a type-writing machine, (a) an alphabet of type-bars striking to a common printing-center; (b) keys, corresponding to said type-bars, and equal in number thereto; (c) an electro-magnet, common to all said type-bars, for actuating said type-bars, to throw said type-bars each as required, from their normal positions to the printing-center; and (d) means, acting when a key is depressed to bring the type-bar corresponding to such key into operative relation with the magnet aforesaid, to receive movement therefrom, and to bring said magnet into action for the impelling of said type-bar, to throw its type from its normal position to the printing-center, so that it prints; and (e) a rheostat connected with the electro-magnet aforesaid, whereby the power of the printing may be governed.

54. In combination, in a type-writing machine, (a) an alphabet of type-bars striking to a common printing-center; (b) keys corresponding to said type-bars, a key for each type-bar; (c) an electro-magnet for actuating all said type-bars, to throw said type-bars, each as required, from its normal position to the printing-center so that it prints; (d) a single circuit-controlling frame operated by all the keys aforesaid, and acting to control the electro-magnet aforesaid; and (e) a rheostat connected with the electro-magnet aforesaid, whereby the power of the printing may be governed.

55. In combination in a type-writing machine, (a) a plurality of type-bars striking to a common printing-center; (b) a vibratory frame for impelling the type-bars aforesaid, each as required; said frame being normally at rest, and said type-bars being normally disconnected therefrom; (c) an electro-magnet for actuating said frame; (d) keys; (e) means controlled by said keys, acting when a key is depressed both to connect the appropriate type-bar with the vibratory frame aforesaid so that it can receive movement therefrom, and for bringing the electro-magnet aforesaid into action to operate the vibratory frame aforesaid and the type-bar connected therewith; and (f) a rheostat connected with the electro-magnet aforesaid.

56. In combination in a type-writing machine, (a) a plurality of type-bars striking to a common printing-center; (b) a vibratory frame for impelling the type-bars aforesaid, each as required; said frame being normally at rest and said type-bars being normally disconnected therefrom; (c) an electro-magnet for actuating said frame; (d) keys; (e) means controlled by said keys acting, when a key is depressed both to connect the appropriate type-bar with the vibratory frame aforesaid so that it can receive movement therefrom and to bring the electro-magnet aforesaid into action to operate the vibratory frame aforesaid and the type-bar connected therewith; the keys aforesaid serving solely when depressed, to connect the type-bars with said vibratory frame and to bring the magnet aforesaid into action, said magnet thereupon operating said frame to impel the type-bar from its normal position to the printing-center, independently of the force exerted by the operator upon the key; whereby when a key is depressed the appropriate type-bar is actuated and the type carried thereby thrown from its normal position toward the printing-center by a force other than that exerted by the operator upon the key, the touch made to be light and the strength of the printing made to be independent of the pressure exerted by the operator upon the key; and (f) a rheostat connected with the magnet aforesaid, whereby the strength of the printing may be governed.

57. In combination in a type-writing machine, (a) a plurality of type-bars striking to a common printing-center; (b) a vibratory frame, normally at rest, for impelling the type-bars aforesaid, each as required; said type-bars being normally disconnected from the vibratory frame; (c) an electro-magnet for actuating said frame; (d) movement-receiving members connected with the type-bars actuated by the frames aforesaid; (e) keys at the key-board; said keys acting when depressed each to give movement to the appropriate movement-receiving member to bring said movement-receiving member into operative relation with the vibratory frame aforesaid to receive movement therefrom; (f) means for bringing the magnet aforesaid into action, controlled by said keys; said magnet serving when a key is depressed to give movement to the vibratory frame aforesaid, thereby to actuate the appropriate type-bar; and (g) a rheostat connected with the electro-magnet aforesaid, whereby the strength of the printing may be controlled independently of the touch upon the key.

58. In combination in a type-writing machine, (a) a plurality of type-bars striking to a common printing-center; (b) a vibratory frame, normally at rest, for impelling the type-bars aforesaid, each as required; said type-bars being normally disconnected from said vibratory frame; (c) an electro-magnet for actuating said frame; (d) movement-receiving members connected with the type-bars actuated by the frame aforesaid, a movement-receiving member for each such type-bar; (e) keys at the key-board, corresponding to the type-bars aforesaid, a key for each type-bar; each of said keys acting, when depressed, to give movement to the movement-receiving member connected with the type-bar to which said key corresponds, to bring said movement-receiving member into operative relation with the vibratory frame aforesaid to receive movement therefrom; said keys controlling the electro-magnet aforesaid; said magnet serving, when one of said keys has been depressed and is at rest in its depressed position, to give movement to the movement-receiving member controlled by such key depressed, and to the type-bar with which said movement-receiving member is connected, to throw the type from its normal position toward the printing-center; whereby the type-bar is actuated and the printing effected by a force other than that exerted upon the key, the touch made to be light, and the strength of the printing made to be independent of the force exerted upon the key; and (f) a rheostat connected with the electro-magnet aforesaid; whereby the strength of the printing may be controlled electrically independently of the touch upon the keys.

59. In combination in a type-writing machine, (a) a plurality of type-bars striking to a common printing center; (b) a vibratory frame normally at rest; (c) an electro-magnet for actuating said frame; (d) movement-receiving members connected with the type-bars aforesaid; (e) keys at the key-board for controlling said movement-receiving members; each of said keys acting when depressed to give movement to the appropriate movement-receiving member to bring said movement-receiving member into operative relation with the vibratory frame aforesaid to receive movement therefrom; (f) a circuit-controlling device for the electro-magnet aforesaid; said circuit-controlling device being common to a plurality of the keys aforesaid; each of said keys to which said circuit-controlling device is common serving when depressed, to operate said circuit-controlling device, thereby to bring the electro-magnet aforesaid into action to operate the frame aforesaid and the type-bar connected therewith by the key depressed; and (g) a rheostat connected with the electro-magnet aforesaid, whereby the power of the type-bar's blow may be controlled electrically independently of the touch upon the key.

60. In combination in a type-writing machine, (a) a plurality of type-bars striking to a common printing-center; (b) a vibratory frame, normally at rest; (c) an electro-magnet for actuating said frame; (d) movement-receiving members connected with the type-bars aforesaid, a member for each type-bar; (e) keys at the key-board, corresponding to the type-bars aforesaid, a key for each type-bar; each of said keys acting, when depressed, to give movement to the movement-receiving member connected with the type-bar to which said key corresponds, to bring said movement-receiving member into operative relation with the vibratory frame aforesaid to receive movement therefrom; (f) a circuit-controlling device for the electro-magnet aforesaid; said circuit-controlling device being common to a plurality of the keys aforesaid, each of said keys to which said circuit-controlling device is common serving, when depressed, to operate said circuit-controlling device; whereby the electro-magnet aforesaid is brought into action to operate the type-bar corresponding to the key depressed, to throw the type from its normal position toward the printing-center, the printing effected by means of a force other than that exerted by the operator upon the key, the touch made to be light, and the strength of the printing made to be independent of the force exerted by the operator upon the key; and (g) a rheostat connected with the electro-magnet aforesaid; whereby the strength of the printing may be controlled electrically independently of the touch upon the key.

61. In combination in a type-writing machine, (a) an alphabet of type-bars striking to a common printing-center; (b) keys corresponding to said type-bars, a key for each type-bar; (c) a type-bar-impelling frame for giving movement to a plurality of the type-bars aforesaid, to throw said type-bars, each as required, from their normal positions to the printing-center; (d) an electro-magnet for actuating said frame; (e) a circuit-controlling frame common to a plurality of the keys aforesaid, controlled by said keys and controlling the circuit of the electro-magnet aforesaid; and (f) a rheostat connected with the electro-magnet aforesaid; whereby the power of the type-bar's blow may be controlled.

62. In combination in a type-writing machine, (a) an alphabet of type-bars striking to a common printing-center; (b) a frame for giving movement to a plurality of the type-bars aforesaid, each as required; said type-bars being normally disconnected from said frame; (c) an electro-magnet for actuating said frame; (d) a movement-receiving member connected with each of the type-bars aforesaid, that is actuated by the frame aforesaid, to receive movement from said frame; (e) keys corresponding to the type-bars aforesaid, a key for each type-bar, a plurality of said keys serving each, when depressed, to give movement to the movement-receiving member connected with the type-bar to which such key corresponds, to throw such movement-receiving member into operative relation with the frame aforesaid to receive movement therefrom; (f) a circuit-closing device, common to a plurality of the keys last aforesaid, and acting, when any of said plurality of keys is depressed, to bring the magnet aforesaid into action to impel the frame aforesaid and the type-bar connected with the movement-receiving member that is brought into operative relation with said frame by the key depressed; and (g) a rheostat connected with the electro-magnet aforesaid; whereby the power of the type-bar's blow may be controlled.

63. In combination, in a type-writing machine, (a) a plurality of type-bars striking to a common printing-center; (b) levers corresponding to said type-bars; (c) links, connecting said levers each with the type-bar to which it corresponds; (d) a frame for giving movement to the type-bars aforesaid, each as required; (e) movement-receiving members, pivoted to the type-bar-corresponding levers aforesaid, a movement-receiving member for each type-bar-corresponding lever; (f) keys, corresponding to the type-bars aforesaid, a key for each of the type-bars that is actuated by the frame aforesaid; said keys each serving, when depressed, to bring the movement-receiving member corresponding to the type-bar to which such key corresponds, into operative relation with the frame aforesaid to receive movement therefrom; (g) an electro-magnet aforesaid acting, when one of the keys aforesaid is depressed, to give movement to the frame aforesaid, thereby to actuate the type-bar corresponding to the key depressed; and (h) a rheostat connected with the electro-magnet aforesaid, whereby the power of the printing blow of the type-bar may be governed independently of the touch upon the key.

64. In combination in a type-writing machine, (a) a plurality of type-bars striking to a common printing-center; (b) levers, corresponding to said type-bars; (c) links, connecting said levers each with the type-bar to which it corresponds; (d) a frame for actuating the type-bars aforesaid, each as required; (e) movement-receiving members, pivoted to the type-bar-corresponding levers aforesaid, a movement-receiving member for each type-bar-corresponding lever; (f) keys, corresponding to the type-bars aforesaid, a key for each of the type-bars that is actuated by the frame aforesaid; said keys each serving, when depressed, to bring the movement-receiving member corresponding to the type-bar to which such key corresponds, into operative relation with the frame aforesaid to receive movement therefrom; (g) an electro-magnet for actuating the type-bar-impelling frame aforesaid; (h) a circuit-controlling device common to a plurality of the keys aforesaid, and serving when one of said keys is depressed, to bring the electro-magnet aforesaid into action to operate the frame aforesaid and the type-bar corresponding to the key depressed; and (i) a rheostat connected with the electro-magnet aforesaid, whereby the power of the printing blow of the type-bar may be governed independently of the touch upon the key.

65. In combination in a type-writing machine having a main key-board, (a) a type-bar; (b) an electro-magnet for actuating said type-bar, to throw the type from its normal position toward the printing-center; said type-bar being normally disconnected from said electro-magnet; (c) a key, at the key-board of said type-writing machine; (d) means, acting, when said key is depressed, to bring the type-bar aforesaid into operative relation with the magnet aforesaid to receive movement therefrom, and to bring said magnet into action, to impel said type-bar from its normal position toward the printing-center; and (e) a rheostat connected with the electro-magnet aforesaid, whereby the power of the printing-blow of the type-bar may be controlled independently of the touch upon the key.

66. In combination in a type-writing machine, (a) a type-bar; (b) an electro-magnet for actuating said type-bar to throw the type from its normal position to the printing-center; said type-bar being normally disconnected from said electro-magnet; (c) a key, permanently connected with the type-bar aforesaid so that said key always, whenever it is depressed, brings said type-bar into operative relation with the electro-magnet aforesaid to receive movement therefrom; said key also controlling said magnet; said magnet acting, when said key is depressed, to impel the type-bar aforesaid independently of the force exerted upon the key, whereby the operator is relieved from the labor of actuating said type-bar and said type-bar impelled with a uniform force in its successive printing actions, notwithstanding variations in the force with which the key controlling it may be depressed; and (d) a rheostat connected with the electro-magnet aforesaid, whereby the power of the printing blow of the type-bar may be controlled independently of the touch upon the key.

67. In a type-writing machine and in combination, (a) a type-bar; (b) a key; (c) an electro-magnet serving to actuate said type-bar; (d) a circuit-controller for said electro-magnet, actuated by the key aforesaid when said key is depressed; and (e) releasing means, whereby the circuit-controller aforesaid is left free to return toward its normal position in advance of the release of the key aforesaid, thereby to release the type-bar aforesaid, all the parts being constructed, arranged and operating in such a manner that when the key aforesaid is depressed to print, another key can also be depressed to print, without waiting to release the key first depressed; and (f) a rheostat connected with the electro-magnet aforesaid, whereby the strength of printing may be controlled independently of the touch upon the key.

68. In a type-writing machine and in combination, (a) a type-bar; (b) a key; (c) an electro-magnet serving to actuate said type-bar; (d) a circuit-closer for the electro-magnet aforesaid; (e) a latch intermediate the key aforesaid and the circuit-closer aforesaid, where through said key, when depressed, gives movement to the circuit-closer aforesaid, so that it closes the circuit of the electro-magnet aforesaid; (f) a frame for acting on said latch, to permit the circuit-closer aforesaid to return toward its normal position, breaking the circuit of the type-bar-impelling magnet aforesaid in advance of the release of the key aforesaid; and (g) a rheostat connected with the electro-magnet aforesaid; whereby the strength of printing may be controlled independently of the touch upon the key.

69. In a type-writing machine and in combination, (a) a type-bar; (b) a key; (c) an electro-magnet for actuating said type-bar; (d) a circuit-controller actuated by the key aforesaid, and releasably connected therewith; said circuit-controller serving, when thus actuated, to cause the electro-magnet aforesaid to give movement to the type-bar aforesaid; said electro-magnet acting also to release the circuit-controller aforesaid, permitting it to return toward its normal position in advance of the release of the key aforesaid, whereby the type-bar is released in advance of the release of said key, all the parts being constructed, arranged and operating in such a manner that when the key aforesaid is depressed to print, another key can also be depressed to print, without waiting to release the key first depressed; and (e) a rheostat connected with the electro-magnet aforesaid, whereby the strength of printing may be controlled independently of the touch upon the key.

70. In a type-writing machine and in combination, (a) a type-bar; (b) a key; (c) an electro-magnet for actuating said type-bar; (d) a circuit-closer for said electro-magnet; (e) a releasable connection intermediate said key and said circuit-closer wherethrough said key, when depressed, gives movement to said circuit-closer to close the circuit of the electro-magnet aforesaid; and (f) a pivoted frame actuated by the electro-magnet aforesaid and acting upon the releasable connection aforesaid to permit the circuit-closer aforesaid to return toward its normal position, breaking the circuit of the electro-magnet aforesaid, in advance of the release of the key; and (g) a rheostat connected with the electro-magnet aforesaid, whereby the strength of printing may be controlled independently of the touch upon the key.

71. In a type-writing machine and in combination, (a) a key; (b) a type-bar; (c) an electro-magnet for actuating said type-bar; (d) a circuit-controller for said electro-magnet, said circuit-controller receiving movement from the key aforesaid when said key is depressed; (e) a paper-carrier; (f) letter-spacing mechanism, controlled by the action of the circuit-controller aforesaid; (g) releasing means whereby the circuit-controller aforesaid is permitted to return toward its normal position in advance of the release of the key aforesaid; and (h) a rheostat connected with the electro-magnet aforesaid; whereby the strength of printing may be controlled independently of the touch upon the key.

72. In a type-writing machine and in combination, (a) a key; (b) a type-bar; (c) a letter-spacing device; (d) a releasing device; (e) electrically-controlled means for actuating the type-bar aforesaid, and also for actuating the spacing device aforesaid and the releasing device aforesaid; (f) circuit-controlling means receiving movement from the key aforesaid and acting, when said key is depressed, to cause the actuating of the type-bar aforesaid, the spacing device aforesaid and the releasing device aforesaid; said releasing device thereupon acting to permit the return of the circuit-controlling means actuated by the key aforesaid toward its normal position in advance of the release of said key; and (g) a rheostat connected with the electro-magnet aforesaid; whereby the strength of printing may be controlled independently of the touch upon the key.

73. In a type-writing machine and in combination, (a) a type-bar; (b) a type-bar-impelling frame normally at rest, the type-bar aforesaid being normally disconnected from said frame; (c) an electro-magnet for actuating said frame; (d) a key; (e) means controlled by said key, whereby the type-bar aforesaid is brought into operative relation with the type-bar-impelling frame aforesaid, to receive movement therefrom when the key aforesaid is depressed; (f) a circuit-controller actuated by the key aforesaid, and serving to control the electro-magnet aforesaid; (g) releasing means, whereby said circuit-controller, when actuated by the key aforesaid, is left free to return toward its normal position in advance of the release of the key aforesaid; and (h) a rheostat connected with the electro-magnet aforesaid; whereby the strength of printing may be controlled independently of the touch upon the key.

74. In a type-writing machine and in combination, (a) a type-bar; (b) a type-bar-impelling frame, normally at rest, the type-bar aforesaid being normally disconnected from said frame; (c) an electro-magnet for actuating said frame; (d) a lever and means operated thereby, whereby the type-bar aforesaid is brought into operative relation with the type-bar-impelling frame aforesaid to receive movement therefrom and whereby the electro-magnet aforesaid is caused to actuate said frame for the impelling of said type-bar; (e) a key for giving movement to said lever; (f) releasing means whereby said lever is left free to return toward its normal position in advance of the release of the key aforesaid, said circuit-controller tending when moved from its normal position by the key aforesaid, to return thereto thereby to permit the type-bar and type-bar-impelling frame aforesaid to return toward their normal positions without waiting for the key aforesaid, controlling them, to be released; and (g) a rheostat connected with the electro-magnet aforesaid; whereby the strength of printing may be controlled independently of the touch upon the key.

75. In a type-writing machine and in combination, (a) a type-bar; (b) a type-bar-impelling frame, normally at rest, the type-bar aforesaid being normally disconnected from said frame; (c) letter-spacing mechanism; (d) a vibratory releaser; (e) electro-magnetic motor mechanism for actuating said type-bar-impelling frame, the letter-spacing mechanism, and the vibratory releaser aforesaid; (f) a lever, and means operated thereby whereby the type-bar aforesaid is brought into operative relation with the type-bar-impelling frame aforesaid, to receive movement therefrom, and whereby the electro-magnetic motor mechanism aforesaid is brought into operation to actuate the type-bar-impelling frame, the letter-spacing mechanism and the vibratory releaser aforesaid; (g) a key; (h) a connection intermediate said key and the lever aforesaid, wherethrough said key when depressed actuates said lever; the vibratory releaser aforesaid acting upon said connection to permit the lever aforesaid, controlling the motor mechanism aforesaid, to return toward its normal position, in advance of the release of the key; and (i) a rheostat, whereby the strength of printing may be governed independently of the touch upon the key.

76. In a type-writing machine having a plurality of type-bars striking to a common printing-center, and in combination, (a) a plurality of keys; (b) type-bar-controlling elements corresponding to and actuated respectively by the keys aforesaid; (c) an electro-magnet for tripping all the type-bar-controlling elements aforesaid, each as required; whereby when a key is depressed the type-bar-controlling element corresponding thereto is left free to return toward its normal position in advance of the release of said key, all the parts being constructed, arranged and operating in such a manner that when a key is depressed to print another key can also be depressed to print, without waiting to release the key first depressed; and (d) a rheostat, connected with the electro-magnet aforesaid, whereby the power of action of said magnet may be controlled.

77. In a type-writing machine having a plurality of type-bars striking to a common printing-center, and in combination, (a) a plurality of keys; (b) type-bar-controlling elements corresponding respectively to and actuated respectively by the keys aforesaid; (c) releasable connections intermediate said keys and said type-bar-controlling elements, a releasable connection intermediate said key and the corresponding type-bar-controlling element; (d) an electro-magnet; (e) a circuit-controller operated by the type-bar-controlling elements aforesaid and controlling the electro-magnet aforesaid; the electro-magnet aforesaid acting, when a key is depressed, upon the connection aforesaid intermediate said key and the type-bar-controlling element operated by said key to permit said type-bar-controlling element and the circuit-closing frame aforesaid operated thereby, to return toward their normal positions in advance of the release of the key depressed; and (f) a rheostat, connected with the electro-magnet aforesaid, whereby the power of action of said magnet may be controlled.

78. In a type-writing machine having a plurality of type-bars striking to a common printing-center, and in combination, (a) a plurality of keys; (b) type-bar-controlling elements corresponding respectively to and actuated respectively by the keys aforesaid; (c) releasable connections intermediate said keys and said type-bar-controlling elements; (d) an electro-magnet; (e) a circuit-controller operated by the type-bar-controlling elements aforesaid and controlling the electro-magnet aforesaid; (f) a frame, operated by the electro-magnet aforesaid, and acting, when a key is depressed, upon the connection aforesaid intermediate said key and the type-bar-controlling element operated by said key to permit said type-bar-controlling element and the circuit-closing frame aforesaid operated thereby, to return toward their normal positions in advance of the release of the key depressed, all the parts being constructed, arranged and operating in such a manner that when a key is depressed to print another key can also be depressed to print, without waiting to release the key first depressed; and (g) a rheostat connected with the electro-magnet aforesaid, whereby the power of action of said magnet may be controlled.

79. A type-writing mechanism, including, (a) a plurality of keys; (b) levers corresponding to said keys; (c) a circuit-controlling frame operated by said levers; (d) releasable connections intermediate said keys and said levers wherethrough said keys, when depressed, actuate said levers and the circuit-controlling frame aforesaid; (e) a releasing-frame for acting on the releasable connections aforesaid; (f) an electro-magnet controlled by the circuit-controlling frame aforesaid, and serving to actuate the releasing-frame aforesaid, whereby when a key is depressed, the lever aforesaid corresponding to said key and the circuit-controlling frame aforesaid, are left free to return to their normal positions in advance of the release of said key, all the parts being constructed, arranged and operating in such a manner that when a key is depressed to print another key can also be depressed to print, without waiting to release the key first depressed; and (g) a rheostat connected with the electro-magnet aforesaid; whereby the power of action of said magnet may be governed.

80. In a type-writing machine and in combination, (a) a plurality of type-bars striking to a common printing-center; (b) a type-bar-impelling frame normally at rest; the type-bars aforesaid being normally disconnected from said frame; (c) an electro-magnet for actuating said frame; (d) keys; (e) means controlled by said keys whereby when a key is depressed the appropriate type-bar is brought into operative relation with the type-bar-impelling frame aforesaid to receive movement therefrom; (f) a circuit-controller actuated by each of the keys aforesaid, controlling the electro-magnet aforesaid; (g) releasing means whereby said circuit-controller, when actuated by the depressing of a key, is left free to return toward its normal position in advance of the release of said key, all the parts being constructed, arranged and operating in such a manner that when a key is depressed to print another key can be depressed to print without waiting to release the key first depressed; and (h) a rheostat whereby the power of the printing blow of the type-bar may be governed.

81. In a type-writing machine and in combination, (a) a plurality of type-bars striking to a common printing-center; (b) a type-bar-impelling frame normally at rest, the type-bars aforesaid being normally disconnected from the frame aforesaid; (c) type-bar-controlling elements and means operated thereby whereby the different type-bars aforesaid are connected with the type-bar-impelling frame aforesaid, each as required; (d) keys, releasably connected with said type-bar-controlling elements; (e) letter-spacing mechanism; (f) a circuit-closing frame, actuated by the keys aforesaid through the type-bar-controlling elements aforesaid; (g) electro-magnetic mechanism controlled by said circuit-closing frame for actuating the type-bar-impelling frame aforesaid and the letter-spacing mechanism aforesaid; (h) releasing means whereby, when a key is depressed, the type-bar-controlling element aforesaid actuated by said key, is left free to return toward its normal position in advance of the release of said key, thereby to permit the printing of a subsequent letter or letters in advance of the release of the key first depressed; and (i) a rheostat whereby the power of the printing-blow of the type-bar may be governed.

82. In combination in a type-writing machine or other similar instrument, (a) a plurality of type-bars arranged so that they strike to a common printing-center; (b) an electro-magnet acting to impel said type-bars, each as required; (c) keys, equal in number to the type-bars impelled by the electro-magnet aforesaid, a key for each type-bar; said keys each acting when depressed to connect the corresponding type-bar with the electro-magnet aforesaid to receive movement therefrom; (d) a circuit-controlling device operated by one or more of the keys aforesaid, and serving when such key is depressed to bring the magnet aforesaid into action to impel the type-bar corresponding to the key depressed; (e) means acting to permit said circuit-controlling device to return toward its normal position in advance of the release of the key depressed, all the parts being constructed, arranged and operating in such a manner that a succeeding key may be depressed to print while the key first depressed is still held down; and (f) a rheostat connected with the electro-magnet aforesaid; whereby the strength of the printing may be controlled independently of the touch upon the key.

83. In combination in a type-writing machine or other similar instrument, (a) a plurality of type-bars arranged so that they strike to a common printing-center; (b) an electro-magnet acting to impel said type-bars, each as required; (c) keys, equal in number to the type-bars impelled by the electro-magnet, aforesaid, a key for each type-bar; said keys, each acting when depressed to connect the corresponding type-bar with the electro-magnet aforesaid, to receive movement therefrom; (d) a circuit-controlling device operated by one or more of the keys aforesaid and serving when such key is depressed to bring the magnet aforesaid into action to impel the type-bar corresponding to the key depressed; (e) means operated by the electro-magnet aforesaid, acting when a key is depressed to permit the circuit-controlling device aforesaid to return toward its normal position in advance of the release of said key, all the parts being constructed, arranged and operating in such a manner that a succeeding key may be depressed to print while the key first depressed is still held down; and (*f*) a rheostat connected with the electro-magnet aforesaid, whereby the strength of the printing may be controlled independently of the touch upon the key.

84. In combination in a type-writing machine, (*a*) a type-bar; (*b*) paper-feeding mechanism, whereby the paper is advanced step by step as the printing progresses; (*c*) a single electro-magnet serving to actuate both the type-bar aforesaid and the paper-feeding mechanism aforesaid; (*d*) a key controlling said magnet; (*e*) means acting when said key is depressed to release both the type-bar aforesaid and the paper-feeding mechanism aforesaid in advance of the release of said key, whereby another key may be depressed to print while the key first depressed is still held down; and (*f*) a rheostat, whereby the strength of printing may be controlled independently of the touch upon the key.

85. In combination in a type-writing machine, (*a*) a type-bar; (*b*) paper-feeding mechanism, whereby the paper is advanced step by step as the printing progresses; (*c*) a single electro-magnet serving to actuate both the type-bar aforesaid and the paper-feeding mechanism aforesaid; (*d*) a circuit-controlling device for said electro-magnet; (*e*) a key; (*f*) a latch intermediate said key and said circuit-controlling device wherethrough said key, when depressed, operates said circuit-controlling device to bring the electro-magnet aforesaid into action to operate the type-bar aforesaid and the paper-feeding mechanism aforesaid; (*g*) means acting, when said key has been depressed, to free said latch, thereby to permit the circuit-controlling device aforesaid to return toward its normal position in advance of the release of said key, whereby another key may be depressed to print while the key first depressed is still held down; and (*h*) a rheostat; whereby the strength of printing may be controlled independently of the touch upon the key.

86. In combination in a typewriting machine, (*a*) a type-bar; (*b*) a type-bar impelling frame; the type-bar aforesaid being normally disconnected from said frame, and said frame being normally at rest; (*c*) a lever, connected with the type-bar aforesaid and a movement-receiving member pivoted to said lever and serving to take motion from the frame aforesaid for the impelling of the type-bar; (*d*) a key at the key-board, acting when depressed to connect the movement-receiving member aforesaid with the type-bar impelling frame aforesaid; (*e*) a motor device also controlled by said key and serving, when said key is depressed, to give movement to the frame aforesaid; and (*f*) a printing-strength-regulating device, connected with the motor device aforesaid and serving to control the velocity of the motion of the type-bar toward the printing point and the strength of the printing blow.

87. In combination in a typewriting machine, (*a*) a type-bar; (*b*) a type-bar impelling frame; the type-bar aforesaid being normally disconnected from said frame; (*c*) a lever, connected with the type-bar aforesaid and a movement-receiving member pivoted to said lever and serving to take motion from the frame aforesaid for the impelling of the type-bar; (*d*) a key at the key-board, acting when depressed to connect the movement-receiving member aforesaid with the type-bar impelling frame aforesaid; (*e*) an electro-magnet, also controlled by said key and serving, when said key is depressed, to give movement to said frame; and (*f*) a printing-strength-regulating device, connected with the electro-magnet aforesaid and serving to control the velocity of the motion of the type-bar toward the printing point and the strength of the printing blow.

88. In combination, in a typewriting machine, (*a*) a type-bar; (*b*) a motor device for actuating said type-bar; (*c*) a key at the key-board controlling said motor-device and acting, when depressed, to cause said motor-device to impel said type-bar; (*d*) a printing-strength-regulating device, connected with the motor device aforesaid, and serving to control the velocity of motion of the type-bar toward the printing point and the strength of its printing blow; and (*e*) means acting to cut off the power from the motor-device aforesaid in advance of the release of the key aforesaid; whereby the type-bar is permitted to return toward its normal position in advance of the release of the key.

89. In combination, in a typewriting machine, (*a*) a type-bar; (*b*) an electro-magnet for actuating said type-bar; (*c*) a key at the key-board controlling the circuit of said electro-magnet and acting, when depressed, to cause said electro-magnet to impel said type-bar; (*d*) a printing-strength-regulating device, connected with the electro-magnet aforesaid, and serving to control the velocity of motion of the type-bar toward the printing point and the strength of its printing blow; and (*e*) means acting to break the circuit of the electro-magnet aforesaid in advance of the release of the key aforesaid; whereby the type-bar is permitted to return toward its normal position in advance of the release of the key.

90. In combination, in a typewriting machine, (*a*) a type-bar; (*b*) a type-bar impelling frame; the type-bar aforesaid being normally disconnected from said frame and said frame being normally at rest; (*c*) a motor device for giving movement to said type-bar impelling-frame; (*d*) a key at the key-board; (e) means controlled by said key, acting when said key is depressed, both to connect the type-bar aforesaid with the type-bar impelling-frame aforesaid and also to bring the motor device aforesaid into action to give movement to said frame, whereby the type-bar is thrown toward the printing point; (f) a printing-strength-regulating device connected with the motor device aforesaid and acting to govern the velocity of motion of the type-bar toward the printing center and the strength of the printing blow effected thereby; and (g) means acting to cut off power from the motor device aforesaid, in advance of the release of the key; whereby the type-bar is permitted to return toward its normal position in advance of the release of the key.

91. In combination, in a typewriting machine, (a) a type-bar; (b) a type-bar impelling frame; the type-bar aforesaid being normally disconnected from said frame; (c) an electro-magnet, for giving movement to said type-bar impelling frame; (d) a key at the key-board; (e) means controlled by said key, acting when said key is depressed, both to connect the type-bar aforesaid with the type-bar impelling frame aforesaid and also to bring the electro-magnet aforesaid into action to give movement to said frame, whereby the type-bar is thrown toward the printing point; (f) a printing-strength-regulating device connected with the electro-magnet aforesaid and acting to govern the velocity of motion of the type-bar toward the printing center and the strength of the printing blow effected thereby and (g) means acting to break the circuit of the electro-magnet aforesaid in advance of the release of the key; whereby the type-bar is permitted to return toward its normal position in advance of the release of the key.

92. In combination, in a typewriting machine, (a) a type-bar; (b) a type-bar impelling frame, the type-bar aforesaid being normally disconnected from said frame; (c) a movement-receiving member connected with said type-bar, for the purpose of receiving movement from said frame; (d) a motor-device for giving movement to said frame; (e) a key at the key-board, acting when depressed, to bring the movement-receiving member connected with the type-bar aforesaid into operative relation with the type-bar impelling frame aforesaid; (f) a motor-controlling device, operated by the key aforesaid, whereby when said key is depressed, the motor device aforesaid is brought into action to give movement to the type-bar impelling frame and to the type-bar aforesaid; (g) a printing-strength-regulating device, acting to govern the velocity of motion of the type-bar toward the printing point and the strength of its printing blow, whereby the power of the printing is made to be controllable at the will of the operator, independently of the touch upon the keys; and (h) means acting to cut off the power from the motor device aforesaid in advance of the release of the key aforesaid; whereby the type-bar is permitted to return toward its normal position in advance of the release of the key.

93. In combination, in a typewriting machine, (a) a type-bar; (b) a type-bar impelling frame, the type-bar aforesaid being normally disconnected from said frame; (c) a movement-receiving member connected with said type-bar, for the purpose of receiving movement from said frame; (d) an electro-magnet for giving movement to said frame; (e) a key at the key-board, acting when depressed, to bring the movement-receiving member connected with the type-bar aforesaid into operative relation with the type-bar-impelling frame aforesaid; (f) means for closing the circuit of said electro-magnet, controlled by the key aforesaid, whereby when said key is depressed, said magnet is brought into action to give movement to the type-bar impelling frame and to the type-bar aforesaid; (g) a printing-strength-regulating device, acting to govern the velocity of motion of the type-bar toward the printing point and the strength of its printing blow, whereby the power of the printing is made to be controllable at the will of the operator, independently of the touch upon the keys; and (h) means acting to break the circuit of the electro-magnet aforesaid in advance of the release of the key aforesaid; whereby the type-bar is permitted to return toward its normal position in advance of the release of the key.

94. In combination, in a typewriting machine (a) a plurality of type-bars striking to a common printing center; (b) a vibratory frame, normally at rest; (c) a motor-device for actuating said frame; (d) movement-receiving members, connected with the type-bars aforesaid, respectively; (e) keys at the key-board, for controlling said movement-receiving members; each of said keys acting, when depressed, to give movement to the appropriate movement-receiving members, so that it brings said movement-receiving member into operative relation with the vibratory-frame aforesaid, to receive movement therefrom; (f) a motor-controlling device, controlling the motor aforesaid, to cause it to operate the vibratory frame aforesaid; said motor-controlling device being common to the plurality of the keys aforesaid; each of said keys, to which said motor controlling device is common, serving when depressed to operate said motor-controlling device, thereby to bring the motor-device aforesaid into action to operate the frame aforesaid and the type-bar connected therewith by the key depressed; and (g) a printing-strength-regulating device, connected with the motor-device aforesaid, whereby the power of the type-bar's blow may be controlled, independently of the touch upon the key.

95. In combination, in a typewriting machine (a) a plurality of type-bars striking to a common printing center; (b) a vibratory frame, normally at rest; (c) an electro-magnet for actuating said frame; (d) movement-receiving members connected with the type-bars aforesaid; (e) keys at the keyboard, for controlling said movement-receiving members; each of said keys acting, when depressed, to give movement to the appropriate movement-receiving member so that it brings said movement-receiving member into operative relation with the vibratory frame aforesaid, to receive movement therefrom; (f) a circuit-controlling device for the electro-magnet aforesaid; said circuit-controlling device being common to the plurality of keys aforesaid; each of said keys, to which said circuit-controlling device is common, serving when depressed, to operate said circuit-controlling device, thereby to bring the electro-magnet aforesaid into action to operate the frame aforesaid and the type-bar connected therewith by the key depressed; and (g) a printing-strength-regulating device, connected with the electro-magnet aforesaid, whereby the power of the type-bar's blow may be controlled independently of the touch upon the key.

96. In a typewriting machine and in combination, (a) a type-bar; (b) a key; (c) a motor device, serving to actuate said type-bar; (d) a controlling device for said motor device, said controlling device being actuated by the key aforesaid, when said key is depressed; and (e) releasing means, whereby the motor-controlling device aforesaid is left free to return toward its normal position in advance of the release of the key aforesaid, thereby to release the type-bar aforesaid; all the parts being constructed, arranged and operating in such a manner that when the key aforesaid is depressed to print, another key can also be depressed to print, without waiting to release the key first depressed; and (f) a printing-strength-regulating device connected with the motor device aforesaid, whereby the velocity of motion of the type-bar toward the printing point and the strength of its printing blow may be controlled, independently of the touch upon the key.

97. In a typewriting machine and in combination, (a) a type-bar; (b) a key; (c) an electro-magnet serving to actuate said type-bar; (d) a circuit-controller for said electro-magnet, actuated by the key aforesaid, when said key is depressed; and (e) releasing means, whereby the circuit-controller aforesaid is left free to return toward its normal position in advance of the release of the key aforesaid, thereby to release the type-bar aforesaid; all the parts being constructed, arranged and operating in such a manner that when the key aforesaid is depressed to print, another key can also be depressed to print, without waiting to release the key first depressed; and (f) a printing-strength-regulating device, connected with the electro-magnet aforesaid, whereby the velocity of motion of the type-bar toward the printing point and the strength of its printing blow may be controlled, independently of the touch upon the key.

98. In a typewriting machine and in combination, (a) a type-bar; (b) a key; (c) a motor-device, serving to actuate said type-bar; (d) a motor-controlling device for the motor device aforesaid; (e) a latch intermediate the key aforesaid and the motor-controlling device aforesaid, wherethrough said key, when depressed, gives movement to the motor-controlling device aforesaid, so that it brings the motor device aforesaid into action to throw the type-bar aforesaid toward the printing center; (f) a frame for acting on said latch, to permit the motor-controlling device aforesaid to return toward its normal position, so that it cuts off the power from the motor device aforesaid, in advance of the release of the key aforesaid and (g) a printing-strength-regulating device, connected with the electro-magnet aforesaid, and whereby the velocity of the type-bar and the strength of its printing blow may be controlled independently of the touch upon the key.

99. In a typewriting machine and in combination, (a) a type-bar; (b) a key; (c) an electro-magnet serving to actuate said type-bar; (d) a circuit-closer for the electro-magnet aforesaid; (e) a latch intermediate the key aforesaid and the circuit-closer aforesaid, wherethrough said key, when depressed, gives movement to the circuit closer aforesaid, so that it closes the circuit of the electromagnet aforesaid; (f) a frame for acting on said latch to permit the circuit closer aforesaid to return toward its normal position, breaking the circuit of the type-bar-impelling magnet aforesaid, in advance of the release of the key aforesaid and (g) a printing-strength-regulating device, connected with the electro-magnet aforesaid, and whereby the velocity of motion of the type-bar and the strength of its printing blow may be controlled independently of the touch upon the key.

100. In a typewriting machine, in which a single electro-magnet is employed to operate a plurality of type-bars each as required, with means by which the several type-bars are connected each as required, with the said electro-magnetic operating device and the said device brought into action to impel the type-bar connected therewith, the method of varying the intensity of printing which consists in varying the amount of current used by varying the resistance of a circuit.

101. In a typewriting machine, in which a single electro-magnet is employed to operate a plurality of type-bars each as required, with means by which the several type-bars are connected each as required, with the said electro-magnetic operating device, and the said device brought into action to impel the type-bar connected therewith, the method of varying the intensity of printing which consists in varying the amount of current used by varying the resistance of the working circuit.

102. In a typewriting machine, the method of printing with a uniform but controllable force, which consists in (a) connecting the type-bar corresponding to the character to be printed, with an electro-magnet; (b) energizing said electro-magnet, and thereby impelling said type-bar; and (c) varying the force of printing, when required, by varying the attractive force of the electro-magnet aforesaid.

103. In a typewriting machine, the method of printing with a uniform but controllable force, which consists in (a) connecting the type-bar corresponding to the character to be printed with an electro-magnet; (b) energizing said electro-magnet, and thereby impelling said type-bar; and (c) varying the force of printing, when required, by varying the density of the magnetic-flux in the electro-magnet aforesaid.

104. In a typewriting machine, the method of printing with a uniform but controllable force, which consists in (a) connecting the type-bar corresponding to the character to be printed with an electro-magnet; (b) energizing said electro-magnet, and thereby impelling said type-bar; and (c) varying the force of printing, when required, by varying the resistance of a circuit connected with the electro-magnet aforesaid.

105. In a typewriting machine, the combination of, (a) type-bars striking to a common printing center; (b) an electro-magnet common to a plurality of the type-bars aforesaid and serving to operate said type-bars each as required; (c) means whereby the type-bars to which the magnet aforesaid is common are connected with said electro-magnet, each as required and said magnet brought into operation to give movement to the type-bar thus connected with it; and (d) a device serving to govern the strength of the printing blow for all the type-bars operated by the electro-magnet aforesaid, and for this purpose acting to regulate the strength of the attraction between the fixed part of the electro-magnet aforesaid and its armature or other movable part.

106. In a typewriting machine, the combination of, (a) type-bars striking to a common printing center; (b) an electro-magnet common to a plurality of the type-bars aforesaid and serving to operate said type-bars each as required; (c) means whereby which the type-bars to which the magnet aforesaid is common are connected with said electro-magnet, each as required and said magnet brought into operation to give movement to the type-bar thus connected with it; and (d) a device acting to vary the power of the printing-blow by governing the strength of the magnet aforesaid.

107. In a typewriting machine, the combination of, (a) type-bars striking to a common printing center; (b) an electro-magnet common to a plurality of the type-bars aforesaid and serving to operate said type-bars each as required; (c) means whereby the type-bars to which the magnet aforesaid is common are connected with said electro-magnet, each as required and said magnet brought into operation to give movement to the type-bar thus connected with it; and (d) a device acting to vary the strength of the printing-blow by varying the strength of the electric current supplied to the electro-magnet aforesaid.

108. In a typewriting machine, the combination of (a) typebars, corresponding to the letters of the alphabet; (b) links pivotally connected with said type-bars, a link for each type-bar; (c) a frame for giving movement to said links; (d) a motor for impelling said frame; (e) keys, corresponding to the letters of the alphabet, and each giving movement to one of the links aforesaid; and (f) a motor controlling device for the motor aforesaid, controlled by a plurality of the keys aforesaid; the levers to which the links aforesaid are connected being arranged on opposite sides of a line drawn parallel to the center of the printing platen, and transverse to the length of the keys.

109. In a typewriting machine, the combination of (a) type-bars, corresponding to the letters of the alphabet; (b) links pivotally connected with said type-bars, a link for each type-bar; (c) a frame for giving movement to said links; (d) a motor for impelling said frame; (e) keys, corresponding to the letters of the alphabet, and each giving movement to one of the links aforesaid, to bring the same into operative relation to the frame aforesaid; (f) a motor-controlling device for the motor aforesaid, controlled by a plurality of the keys aforesaid; the lever to which the links aforesaid are connected being arranged on opposite sides of a line drawn parallel to the center of the printing platen, and transverse to the length of the keys; and (*g*) a printing-intensity-regulating device acting to control the force of the motor aforesaid, and thereby the force of the printing blow.

110. In a typewriting machine, the combination of (*a*) type-bars corresponding to the letters of the alphabet; (*b*) links pivotally connected with said type-bars, a link for each type-bar; (*c*) a frame for giving movement to said links; (*d*) an electro-magnet for giving movement to said frame; (*e*) keys, corresponding to the letters of the alphabet, and each giving movement to one of the links aforesaid, to bring the same into operative relation to the frame aforesaid; and (*f*) a circuit controlling device for the circuit of the electro-magnet aforesaid, said circuit-controlling device being operated by a plurality of the keys aforesaid; the levers to which the links aforesaid are connected being arranged on opposite sides of a line drawn parallel to the center of the printing platen, and transverse to the length of the keys.

111. In a typewriting machine, the combination of (*a*) type-bars, corresponding to the letters of the alphabet; (*b*) links pivotally connected with said type-bars, a link for each type-bar; (*c*) a frame for giving movement to said links; (*d*) an electro-magnet for giving movement to said frame; (*e*) keys, corresponding to the letters of the alphabet, and each giving movement to one of the links aforesaid, to bring the same into operative relation to the frame aforesaid; (*f*) a circuit-controlling device for the circuit of the electro-magnet aforesaid, said circuit-controlling device being operated by a plurality of the keys aforesaid; the levers to which the links aforesaid are connected being arranged on opposite sides of a line drawn parallel to the center of the printing platen, and transverse to the length of the keys; and (*g*) a printing-intensity-regulating device, acting to control the force of the type-bars' blow and the weight of printing by varying the strength of the impulse given by the electro-magnet aforesaid to the frame aforesaid.

112. In a typewriting machine, the combination of (*a*) type-bars, corresponding to the letters of the alphabet; (*b*) links pivotally connected with said type-bars, a link for each type-bar; (*c*) a frame for giving movement to said links; (*d*) an electro-magnet for giving movement to said frame; (*e*) keys corresponding to the letters of the alphabet, and each giving movement to one of the links aforesaid, to bring the same into operative relation to the frame aforesaid; (*f*) a circuit-controlling device for the circuit of the electro-magnet aforesaid, said circuit-controlling device being operated by a plurality of the keys aforesaid; the levers to which the links aforesaid are connected being arranged on opposite sides of a line drawn parallel to the center of the printing platen and transverse to the length of the keys; and (*g*) a printing-intensity-regulating device, acting to control the force of the type-bar's blow and the weight of printing by varying the strength of the impulse given by the electro-magnet aforesaid to the frame aforesaid, by varying the resistance of a circuit.

113. In an electrically operated typewriter, the combination of (*a*) a type-bar; (*b*) an electro-magnet for impelling said type-bar; (*c*) an automatic-releasing device, whereby said type-bar is left free to return to its normal position in advance of the release of the key controlling it; and (*d*) an intensity-regulating device, whereby the force of the type-bar's stroke may be varied as required.

114. In combination, in an electrically-operated type-writing machine, (*a*) type-bars, striking to a common printing center; (*b*) an electro-magnet for impelling said type-bars; (*c*) keys, corresponding to said type-bars; (*d*) means operated by the keys aforesaid, whereby said type-bars are connected with the electro-magnet aforesaid, so as to receive movement therefrom, each type-bar, when the key corresponding to it is depressed; (*e*) an automatic releasing device, whereby when a key is depressed, the frame aforesaid and the type-bar operated thereby, are left free to return to their normal positions, in advance of the release of the key depressed; and (*f*) a regulating device, whereby the force of the type-bar's blow may be varied as required.

115. In a typewriting machine, the combination of (*a*) type-bars, striking to a common printing center; (*b*) a frame, for giving movement to said type-bars; (*c*) levers corresponding to the type-bars aforesaid; said levers being arranged on opposite sides of a line parallel to the center of the printing platen; each of said levers being connected at one end with one of the type-bars aforesaid; (*d*) movement-receiving-members pivoted to the other ends of the levers aforesaid; (*e*) keys, each controlling one of said movement-receiving-members and serving, when depressed, to bring the movement-receiving member thus controlled by it into operative relation to the frame aforesaid, so that it receives movement from said frame and transmits said movement to the type-bar to which it is connected; (*f*) a motor device for actuating the frame aforesaid; and (*g*) a motor-controlling device operated by a plurality of the keys aforesaid and serving when one of said keys is depressed to bring said motor into action to operate the frame aforesaid and the type-bar connected therewith and corresponding to the key depressed.

116. In a typewriting machine, the combination of (a) type-bars, striking to a common printing center; (b) a frame, for giving movement to said type-bars; (c) levers corresponding to the type-bars aforesaid; said levers being arranged on opposite sides of a line parallel to the center of the printing platen; each of said levers being connected at one end with one of the type-bars aforesaid; (d) movement-receiving-members pivoted to the other ends of the levers aforesaid; (e) keys, each controlling one of said movement-receiving-members and serving, when depressed, to bring the movement-receiving-member thus controlled by it into operative relation to the frame aforesaid so that it receives movement from said frame and transmits said movement to the type-bar to which it is connected; (f) a motor device for actuating the frame aforesaid; (g) a motor-controlling device operated by a plurality of the keys aforesaid and serving when one of said keys is depressed to bring said motor into action to operate the frame aforesaid and the type-bar connected therewith and corresponding to the key depressed; and (h) a printing intensity-regulating device, acting to control the force of the motor aforesaid, and thereby the force of the printing blow.

117. In a typewriting machine, the combination of (a) type-bars, striking to a common printing center; (b) a frame, for giving movement to said type-bars; (c) levers corresponding to the type-bars aforesaid; said levers being arranged on opposite sides of a line parallel to the center of the printing platen; each of said levers being connected at one end with one of the type-bars aforesaid; (d) movement-receiving-members pivoted to the other ends of the levers aforesaid; (e) keys, each controlling one of said movement-receiving-members and serving, when depressed, to bring the movement-receiving-member thus controlled by it into operative relation to the frame aforesaid, so that it receives movement from said frame and transmits said movement so the type-bar to which it is connected; (f) an electro-magnet for actuating the frame aforesaid; and (g) a circuit-controlling device operated by a plurality of the keys aforesaid and serving when one of said keys is depressed to bring said motor into action to operate the frame aforesaid and the type-bar connected therewith and corresponding to the key depressed.

118. In a typewriting machine, the combination of (a) type-bars, striking to a common printing center; (b) a frame, for giving movement to said type-bars; (c) levers corresponding to the type-bars aforesaid; said levers being arranged on opposite sides of a line parallel to the center of the printing platen; each of said levers being connected at one end with one of the type-bars aforesaid; (d) movement-receiving-members pivoted to the other ends of the levers aforesaid; (e) keys, each controlling one of said movement-receiving-members and serving, when depressed, to bring the movement-receiving member thus controlled by it into operative relation to the frame aforesaid so that it receives movement from said frame and transmits said movement to the type-bar to which it is connected; (f) an electro-magnet for actuating the frame aforesaid; (g) a circuit-controlling device, operated by a plurality of the keys aforesaid and serving when one of said keys is depressed to bring said motor into action to operate the frame aforesaid and the type-bar connected therewith and corresponding to the key depressed; and (h) a printing-intensity-regulating device, acting to control the force of the motor aforesaid, and thereby the force of the printing blow.

In testimony whereof I have hereunto set my hand at Washington, in the District of Columbia, this fourth day of November, Anno Domini one thousand eight hundred and ninety-nine, in the presence of the subscribing witnesses, whose names are hereto affixed.

THADDEUS CAHILL.

Witnesses:
H. L. BISSELLE,
ARTHUR T. CAHILL.